United States Patent [19]

Umebayashi et al.

[11] Patent Number: 4,638,287
[45] Date of Patent: Jan. 20, 1987

[54] VEHICLE-LOADED DISPLAY DEVICE

[75] Inventors: Kazuyuki Umebayashi; Takahiro Yamada, both of Ikenohata, Japan

[73] Assignee: Aisin Seiki Kabushikikaisha, Aichi, Japan

[21] Appl. No.: 569,682

[22] Filed: Jan. 10, 1984

[30] Foreign Application Priority Data

Mar. 1, 1983 [JP] Japan .................. 58-34263
Mar. 1, 1983 [JP] Japan .................. 58-34264

[51] Int. Cl.⁴ .............................. G08G 1/00
[52] U.S. Cl. .................. 340/22; 307/10 R; 339/35; 180/78
[58] Field of Search ........... 180/78; 307/10 R; 340/22, 700, 712; 339/35; 324/114, 115

[56] References Cited

U.S. PATENT DOCUMENTS 1,795,566 3/1931 MacComb .................. 180/78
4,157,854 6/1979 Beauch .................. 339/35
4,386,279 5/1983 Yoshimi et al. .............. 307/10 R
4,464,933 8/1984 Santis .................. 340/712

FOREIGN PATENT DOCUMENTS 0110542 7/1982 Japan .................. 180/78

Primary Examiner—Charles A. Ruehl
Assistant Examiner—I. Rittmaster
Attorney, Agent, or Firm—Sughrue, Mion, Zinn, Macpeak & Seas

[57] ABSTRACT

Key switches, a plane type CRT display, a modulator, a demodulator, etc. are arranged in a control board mounted on a steering wheel, while a TV camera, a character information generator, a modulator, a demodulator, etc., are arranged on the side of the vehicle body. Electric circuits on the control board and the vehicle body are interconnected through slip rings and brushes, and display information is transmitted from the vehicle body side to the control board in accordance with operation of the key switches on the control board, thus permitting the information to be displayed on the control board. A signal corresponding to operation of the key switches and a display information signal are made to have different frequencies from each other and then transmitted through the same line in a superimposed fashion.

6 Claims, 27 Drawing Figures

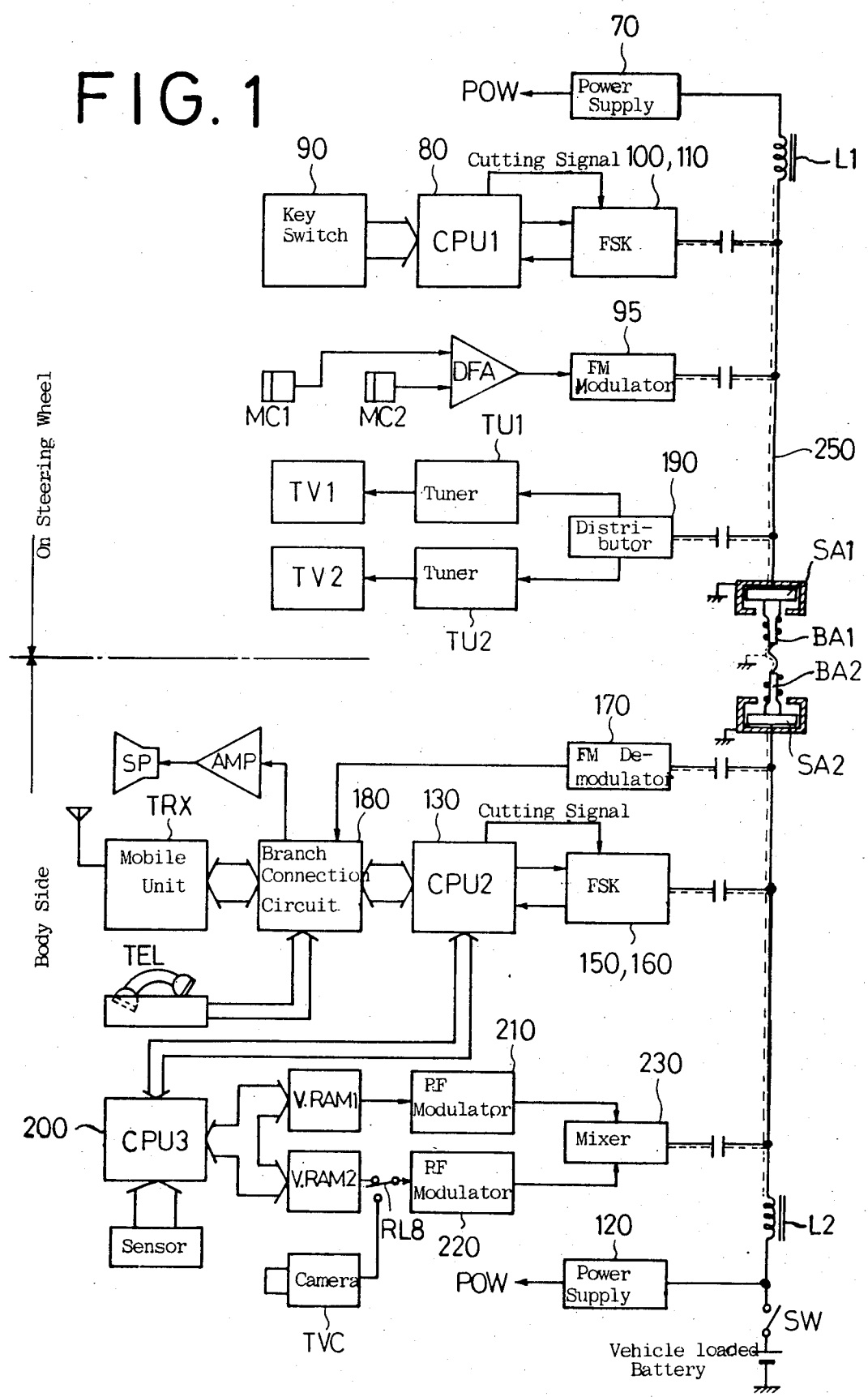

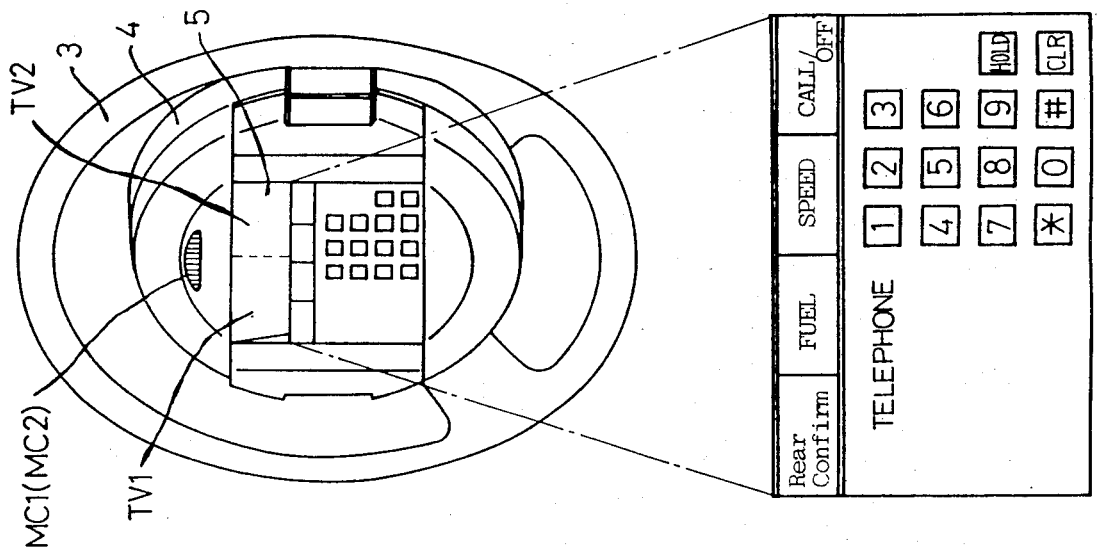
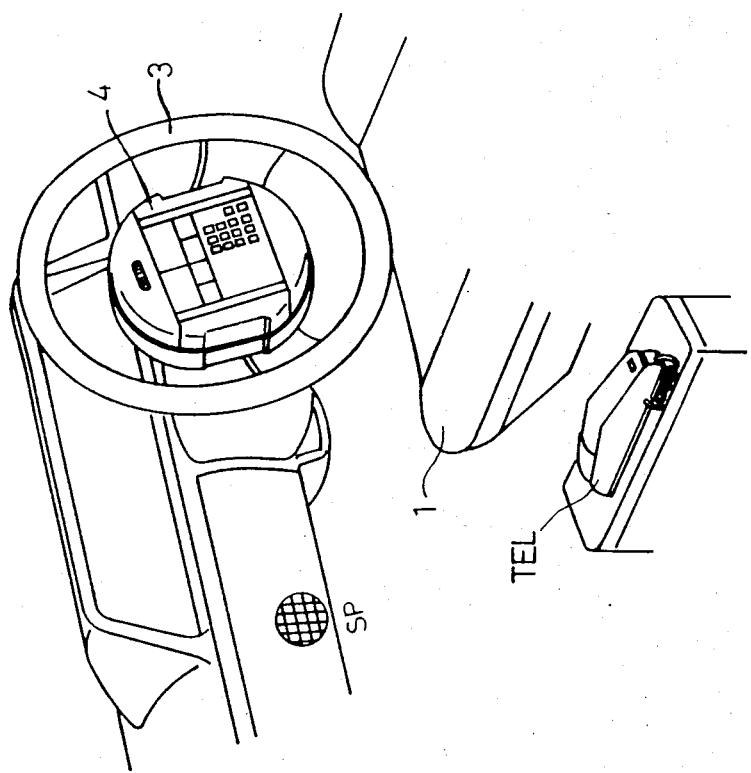

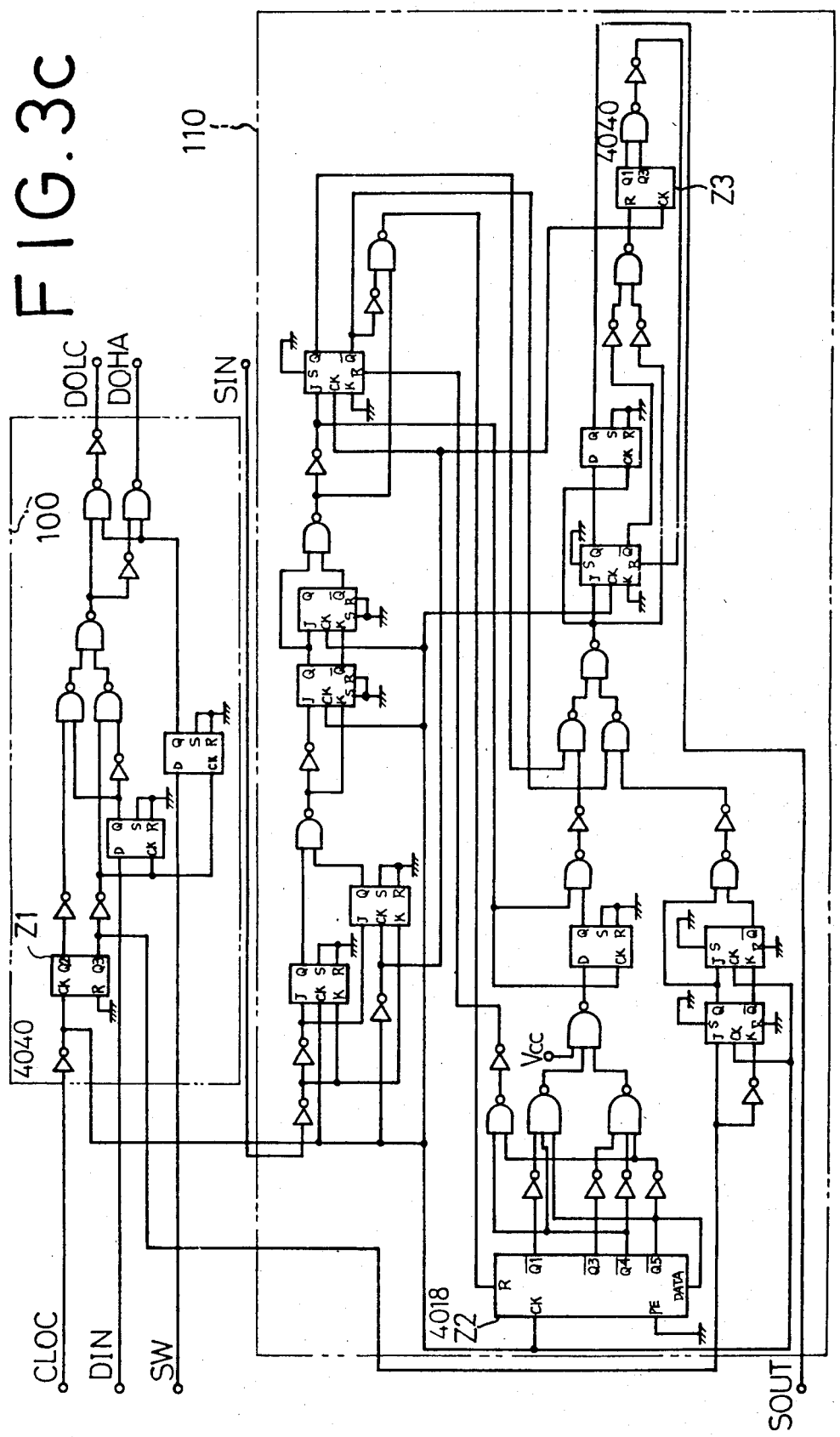

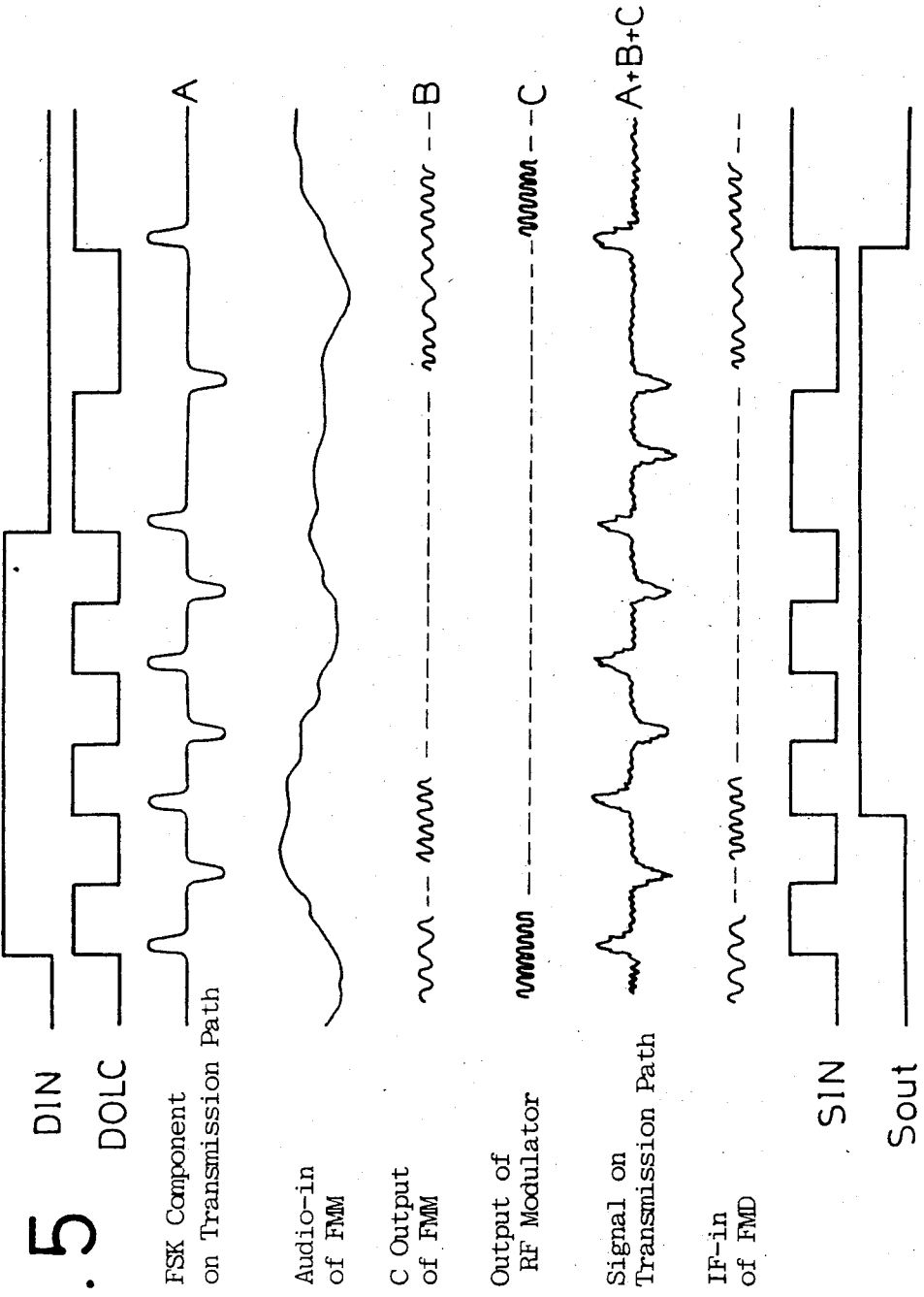

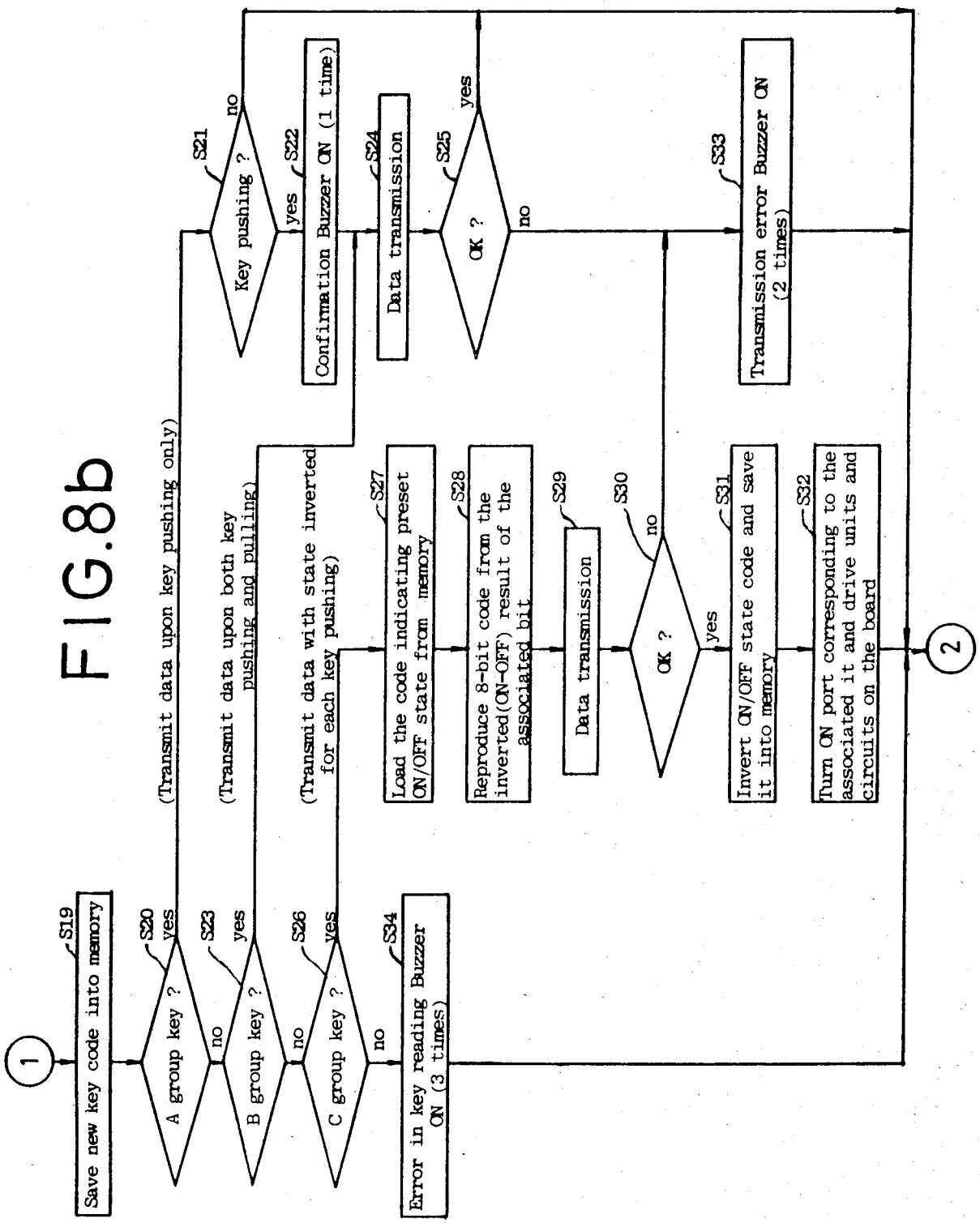

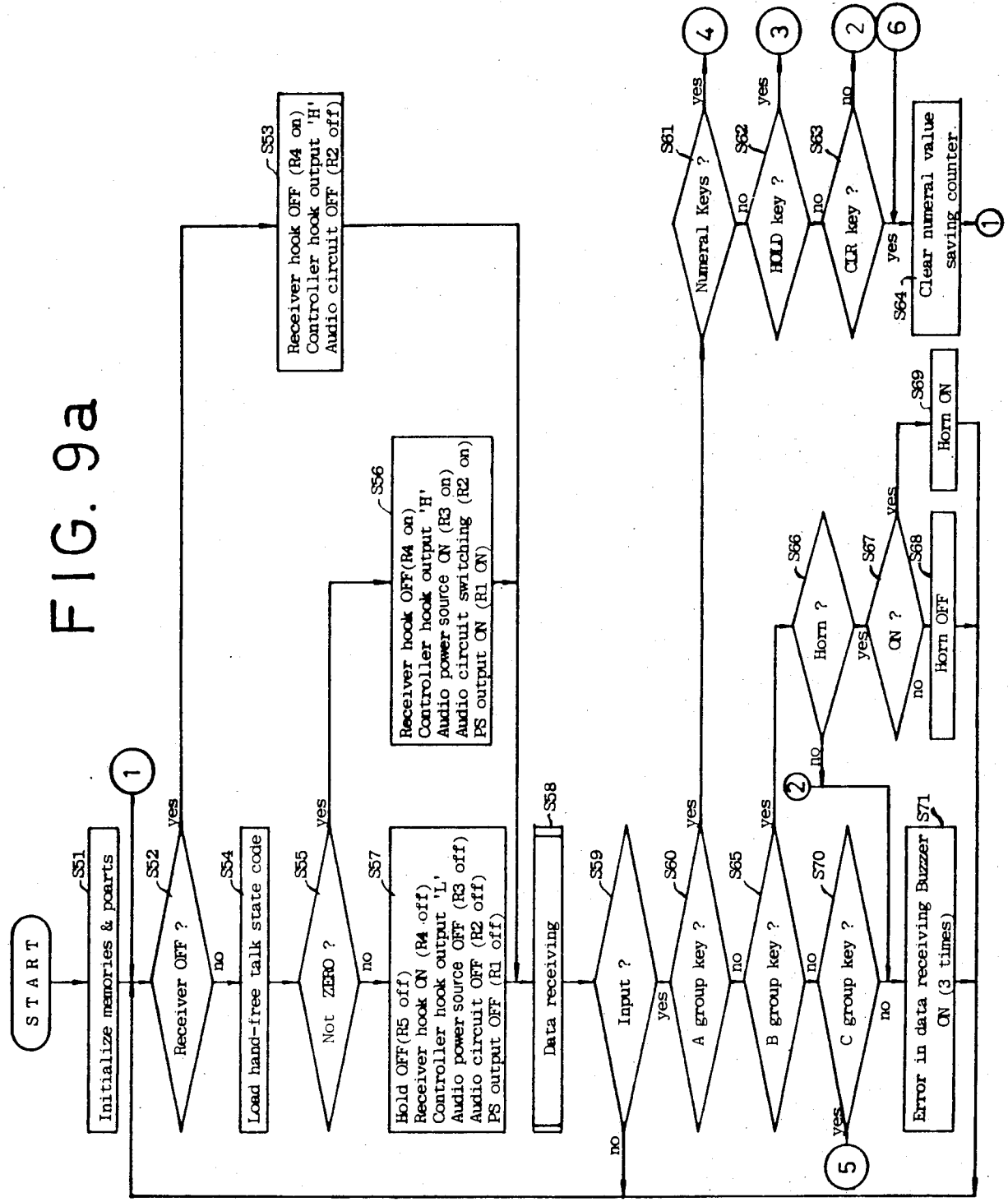

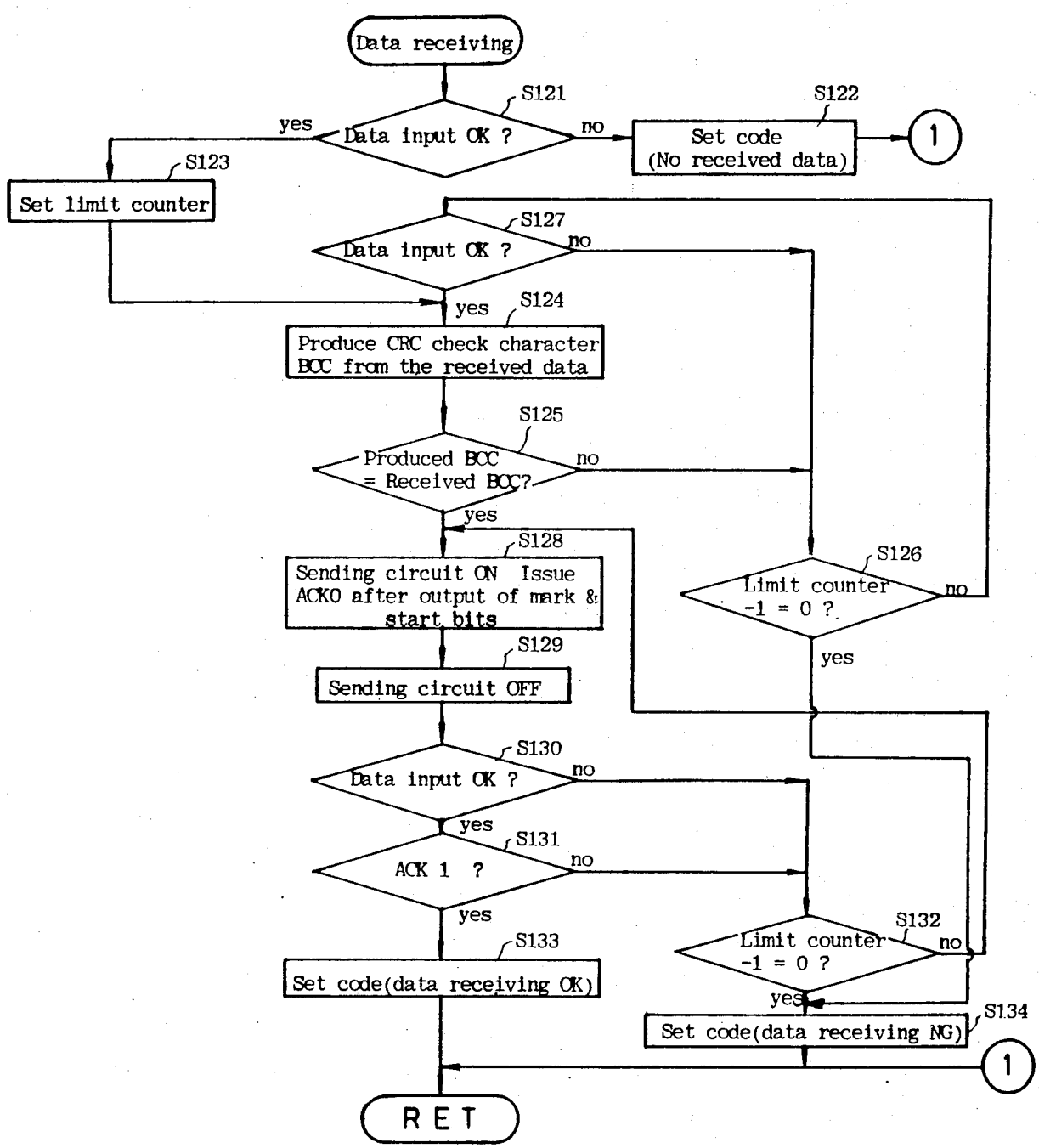

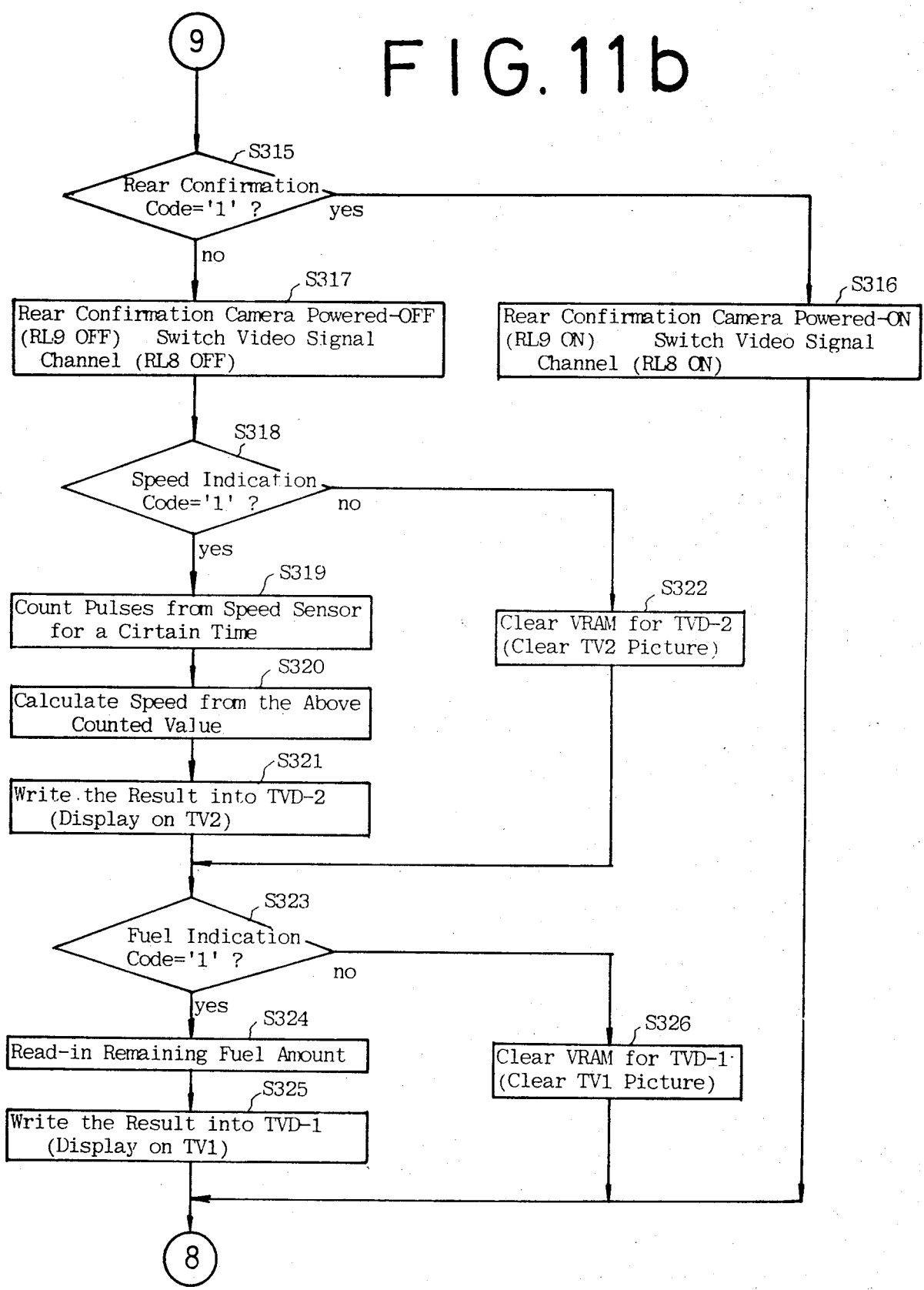

VEHICLE-LOADED DISPLAY DEVICE

BACKGROUND OF THE INVENTION

This invention relates to a vehicle-loaded display device adapted to indicate various numeral information, image information, etc. on a two-dimensional display, and more particularly to a vehicle-loaded display device in which a two-dimensional display is arranged on a steering wheel allowing the driver to see its screen easily.

In vehicles, a steering wheel is positioned nearest to the driver, more specifically to his hands. For the purpose of improving the operability, therefore, a control board equipped with key switches or so for instructing the control of vehicle-loaded apparatus and units, indicators, etc. are preferably mounted at the central portion of the steering wheel.

Further, two-dimensional displays such as a Braun tube type display (CRT) are preferable to be used as an indicator when indicating a large quantity of information or image information. In general, however, since there are arranged a number of apparatus and units in the vicinity of the driver's seat, it is difficult to secure a large space there for the purpose of indication. Accordingly, small-sized displays must be used in such case. But, the reduction in size of the used display makes it harder to see the information indicated on the screen, so that the display is preferably arranged on a steering wheel which locates near the driver. On the other hand, since the available space on the steering wheel is also limited, there can be mounted thereon no more than the minimum constituent members such as key switches and a two-dimensional display.

With the arrangement as mentioned above, in spite of such a need that a large quantity of information must be transmitted between a steering control board and the vehicle body side, a steering mechanism for transmitting rotation of the steering wheel to a steering shaft has a complicated structure, and this results in difficulty in writing for the power supply and the signal cables used to connect a control board mounted at the center of the steering wheel (i.e., steering control board) with a stationary control unit. An interconnection mechanism comprising a combination of slip rings and brushes can be employed in order to effect the wiring without causing any obstruction against rotation of the steering wheel, but a larger number of slip rings and brushes are required for transmitting a larger variety of information. This causes the interconnection mechanism to be complicated in its structure and to require a wider space for its installation. As a result, such wiring will be confronted with a substantial difficulty particularly in the steering mechanism which has a strictly limited space available thereto.

SUMMARY OF THE INVENTION

The first object of this invention is to arrange a two-dimensional display in a position near a steering wheel, so that the indicated content can be viewed easily and clearly even with the small-sized screen.

The second object of this invention is to prevent the structure of a steering wheel section from being complicated and increased in its volume as well as to make simple the structure of an interconnection mechanism for connecting the device body with a steering control board.

To achieve the foregoing objects, according to this invention, key switches and a two-dimensional display are arranged in the control board mounted on the steering wheel; a TV camera outputting image information, a character information generator, etc. are arranged on the side of the device body; a demodulator adapted to demodulate display information and a modulator adapted to output key-in information are provided in the control board on the steering wheel; a demodulator adapted to demodulate the key-in information and a modulator adapted to output the display information are provided on the side of the device body; a modulated wave obtained from the key-in information and a modulated wave obtained from the display information are set in signals with frequencies different from each other; and these signals are led to the same transmission path.

According to a preferred embodiment of this invention, a power supply line is connected to one transmission path via an electric coil which has relatively high impedance against an AC signal, thereby to perform both supply of power source and transmission of various signals using a single transmission path. With this embodiment, since only one transmission path is used, the wiring to connect the device body with the control board on the steering wheel can be simplified.

In case that a two-dimensional display is disposed in the control board on the steering wheel, it becomes hard to see the indication if the two-dimensional display is rotated with turning of the steering wheel. According to a preferred embodiment of this invention, the control board is mounted in a floating manner relative to the steering wheel and at least two sets of electric interconnection mechanisms each comprising a slip ring and a brush are provided, one of which is used to connect the steering wheel with the vehicle body side and the other of which is used to connect the steering wheel with the steering control board. With this embodiment, the screen is not inclined even with the steering wheel being inclined. For example, therefore, in case of indicating images from a TV camera directed to the rear of the vehicle for the rear safety confirmation, it becomes possible for the driver to steer the handle while looking at the indication on the screen, thus guiding him, for example, to drive the vehicle into a garage.

When a line for transmitting signals and a line for feeding electric power are arranged independently from each other, at least two transmission paths are required. According to a preferred embodiment of this invention, therefore, plural sets of slip rings are arranged in a concentric relation so as to constitute a plurality of transmission paths, through which signals and electric power are applied or fed.

In case of mounting a telephone set, a radio apparatus or the like on a vehicle, a microphone is preferably disposed in a fixed manner because there may occur a danger if the driver releases his hold of the handle during driving. It is also desirable that the microphone is arranged on the steering wheel, which is positioned near the driver, for the purpose of preventing ingress of sounds from the sorroundings. According to a preferred embodiment of this invention, therefore, an analog modulator connected to the microphone and its output terminal is provided on the steering control board, while an analog demodulator is provided on the side of the device body and a demodulated output signal therefrom is applied to the telephone set or so.

BRIEF DESCRIPTION OF THE DRAWINGS

FIG. 1 is a schematic system block diagram showing one embodiment of the display device according to this invention.

FIG. 2a is a perspective view showing a steering wheel and the vicinity of a driver's seat in an automobile equipped with the device of FIG. 1.

FIG. 2b is a perspective view showing the steering wheel of FIG. 2a.

FIG. 2c is a side view showing the mounting structure for the steering wheel section of FIG. 2a.

FIG. 3c is a block diagram showing the constitution of an FSK modulation/demodulation circuit.

FIG. 5 is a waveform diagram showing schematic signal waveforms at the respective sections in the device of FIG. 1.

FIGS. 8a and 8b are flow charts showing the operation of a microcomputer CPU1 in FIG. 1.

FIGS. 9a, 9b, 9c and 9d are flow charts showing the operation of a microcomputer CPU2 in FIG. 1.

FIG. 10b is a flow chart showing the data receiving operation of the microcomputer CPU2.

FIGS. 11a and 11b are flow charts showing the operation of a microcomputer CPU3.

DESCRIPTION OF PREFERRED EMBODIMENTS

Figure 2C:
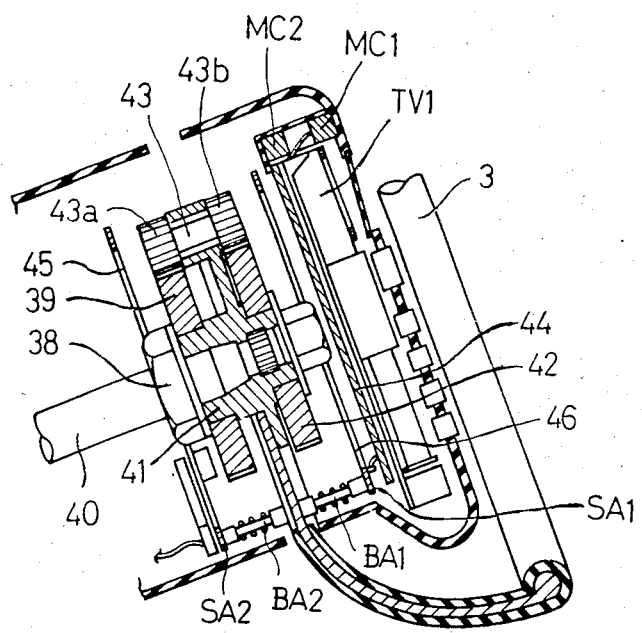

FIG. 1 shows the schematic constitution of a display device according to one embodiment of this invention. Description will be made first by referring to FIG. 1. In this embodiment, a steering control board includes therein a constant-voltage power supply unit 70, a microcomputer unit 80 (CPU1) adapted to perform control on the steering control board, a key switch 90, FSK modulation/demodulation circuits 100, 110, microphones MC1, MC2, a differential amplifier DFA, an FM mcdulator 95, a pair of two-dimensional displays or monitor TV sets TV1, TV2, tuners TU1, TU2, a distributor 190, etc.

Microphones MC1 and MC2 are arranged in the same direction (i.e., toward the mouth of the driver) with a predetermined spacing therebetween, and they have output terminals connected to different input terminals of the differential amplifier DFA. This causes the DFA to amplify the difference between a sound applied to one microphone MC1 and a sound applied to the other microphone MC2, so that there can be attained large output for the sound entering along the direction of arrangement of both MC1 and MC2, i.e., from the direction of the driver. In other words, sideward noises are respectively offset, whereby only a signal corresponding to the voice of the driver is largely amplified and then applied to the FM modulator 95.

In this embodiment, a control unit mounted on the vehicle body side includes therein a constant-voltage power supply unit 120, a microcomputer unit 130 (CPU2), FSK modulation/demodulation circuits 150, 160, an FM demodulation circuit 170, a telephone set TEL, a mobile unit or a radio apparatus TRX for the telephone set, a branch connection circuit 180, an amplifier AMP, a loudspeaker SP, a microcomputer unit 200 (CPU3) for display, video RAM's VRAM1, VRAM2, modulators 210, 220, a TV camera TVC, a mixer 230, etc.

A transmission path 250 serves to connect the steering control board with the vehicle body side through a pair of interconnection mechanisms, one of which comprises a slip ring SA1 and a brush BA1 and the other of which comprises a slip ring SA2 and a brush BA2. On the steering control board, the FSK modulation/demodulation circuits 100, 110, the FM modulation circuit 95 and the distributor 190 are connected to the transmission path 250 via capacitors, while the stabilized power supply 70 is connected thereto via an electric coil L1. On the side of the vehicle body, the FSK modulation/demodulation circuits 150, 160, the FM demodulation circuit 170 and the mixer 230 are connected to the transmission path 250 via capacitors, while the stabilized power supply 120 and one terminal of a power supply switch SW in interlock relation with an ignition key switch are connected thereto via an electric coil L2.

FIG. 2a shows the vicinity of the driver's seat in a vehicle equipped with the device illustrated in FIG. 1, and FIG. 2b shows an external appearance of the steering wheel including the vicinity thereof. Now referring to FIGS. 2a and 2b, the telephone set TEL is disposed on the left side of a driver's seat 1 and the speaker SP is disposed in front thereof. At the central portion of a steering wheel 3 there is mounted a steering control board 4 in a floating fashion relative to the steering wheel 3. Two screens of the monitor TV sets TV1, TV2, a rear confirmation key, a fuel key, a speed key, a call/off key, ten-keys for telephone set, a hold key, a clear key, etc. are exposed from a front panel 5 of the steering control board 4. It is to be noted that plane type Braun (cathode-ray) tube displays made by Sony Corporation are used as those monitor TV sets TV1 and TV2.

FIG. 2c shows the schematic mounting structure between the steering wheel 3 as well as the steering control board 4 and the vehicle body. Now referring to FIG. 2c, a support 38 is fixed to a support 41 which in turn supports a gear 39 in a rotatable manner. The gear 39 is fixed to the vehicle body. The support 41 is rigidly connected to a steering shaft 40, and the steering wheel 3 is coupled to the support 41. The support 41 rotatably supports both gears 39 and 42. Designated at the reference number 43 is a connecting member which has at both ends gears 43a and 43b, respectively, each having an equal number of teeth, and which is rotatably supported by the support 41. The gears 43a and 43b are meshed with the gears 39 and 42, respectively. A printed circuit board 44 and the control panel 5 in the steering control board are rigidly connected to the gear 42. The gears 39 and 42 have an equal number of teeth. With the arrangement as mentioned above, the control panel 5 and other parts are not rotated together with the turning operation of the steering wheel 3. In this embodiment, more specifically, when the steering wheel 3 is turned, both the support 41 and the steering shaft 40 are rotated together so as to effect the steering operation. At this time, since the gears 43a and 39 have the same number of teeth as the gears 43b and 42, respectively, a relative movement amount (angle) between the support 41 and the gear 39 becomes equal to a relative movement amount between the support 41 and the gear 42, those relative movements being caused by the arcuate movement of the connecting member 43 attendant on the rotation of the support 41. Consequently, the gear 42 is not rotated relative to the gear 39 because the gear 39 is fixed, so that the control panel 5 will not be rotated even with the steering wheel 3 being turned.

The steering wheel 3 is provided with two brushes BA1 and BA2 electrically connected to each other. The brush BA1 has its one end in abutment with the slip ring SA1 which is provided on the side of the steering control board, while the brush BA2 has its one end in abutment with the slip ring SA2 which is provided on the stationary side of the vehicle.

Figure 2D:
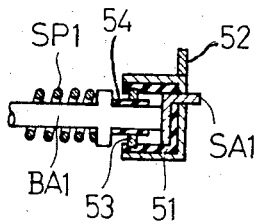
FIGS. 2d and 2e are respectively an enlarged sectional view and an exploded perspective view showing the mounting structure of a brush BA1, a slip ring SA1 and others.
Figure 2E:
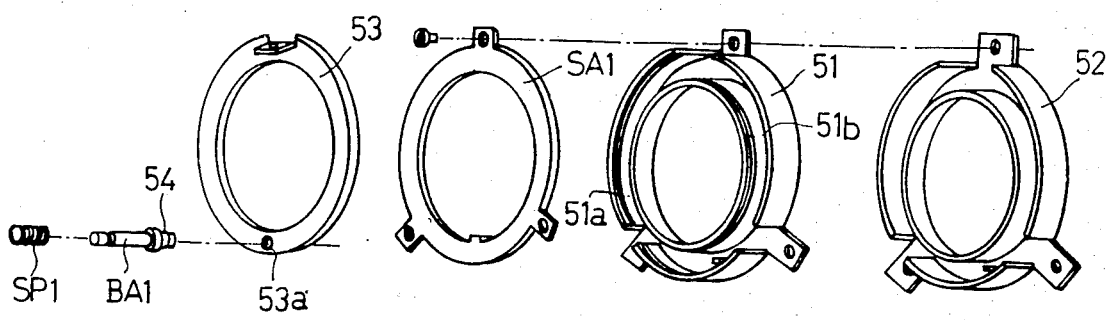

FIGS. 2d and 2e show the structure of the part in the vicinity of the slip ring SA1 in more detail. Description will be now made by referring to FIGS. 2d and 2e. In this example, the electromagnetic shield is also applied to the slip rings SA1, SA2, etc. in order to prevent reduction in the S/N (signal/noise) ratio of a transmitted signal, which would be caused by an electromagnetic wave coming from the outside. More specifically, a resin-made insulating plate 51 is formed with a ring-shaped recess with a predetermined width and the slip ring SA1 is fitted in the recess. Then, conductive shield plates 52 and 53 are fitted so as to embrace the plate 51. The shield plate 53 is fixed in annular grooves 51a and 51b of the insulating plate 51. The brush BA1 is mounted at its end portion with a resin-made collar 54, and has its tip which penetrates through a hole 53a in the shield plate 53 and which is brought into abutment with the slip ring SA1 at all times by a pressing force of a compression coil spring SP1.

The shield plate 52 is electrically connected to the gear 42 and the shield plate 53 is electrically connected to the steering wheel 3, thereby to effect grounding to the vehicle body, respectively. The slip ring SA2 and the brush BA2 including the vicinity thereof are constructed likewise, and two shield plates (not shown) on this side are respectively connected to the steering wheel 3 and the steering shaft 40 for grounding to the vehicle body.

Figure 3A:
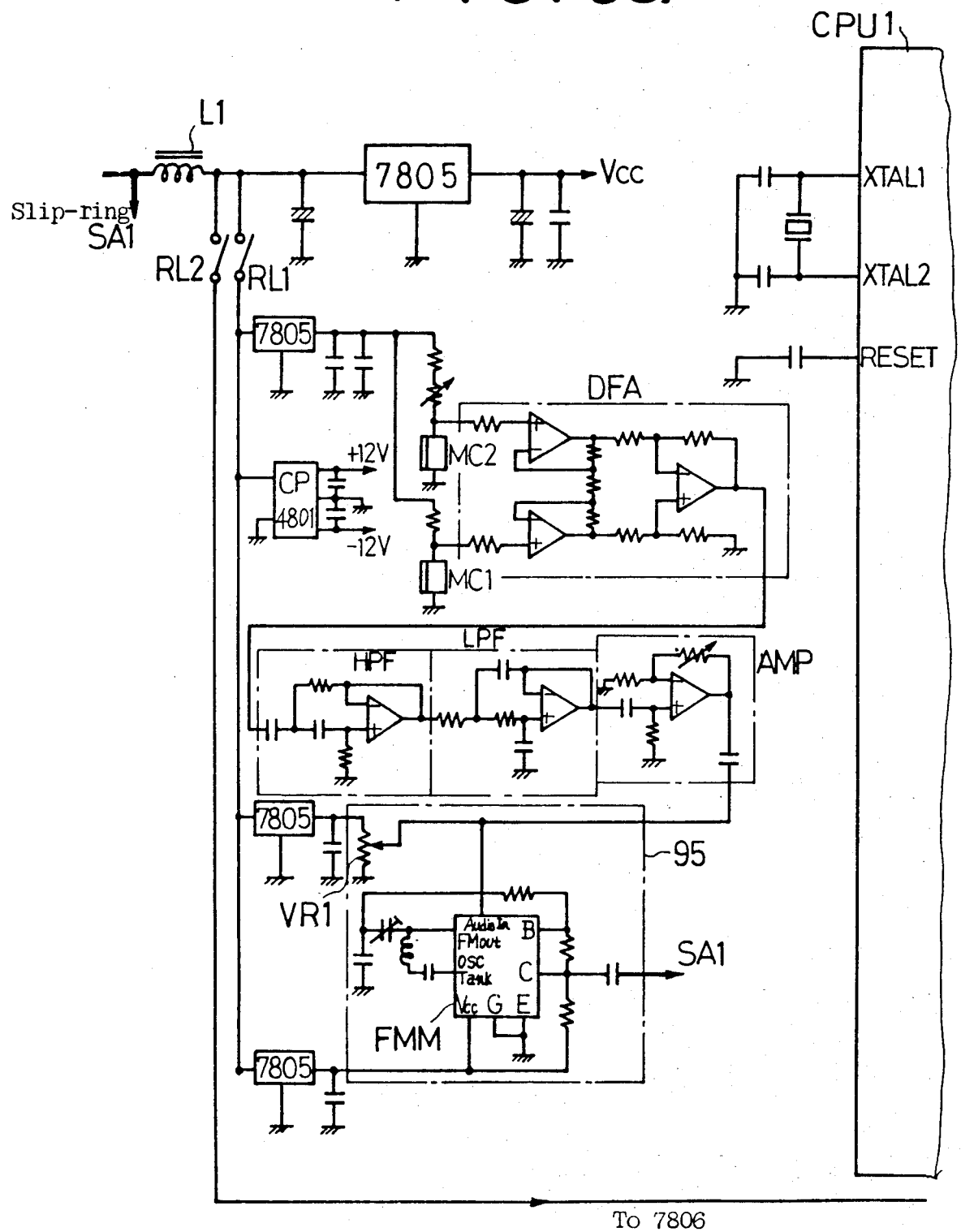
FIGS. 3a and 3b are block diagrams showing an electric circuit included in the control board on the steering wheel of the device in FIG. 1.
Figure 3B:
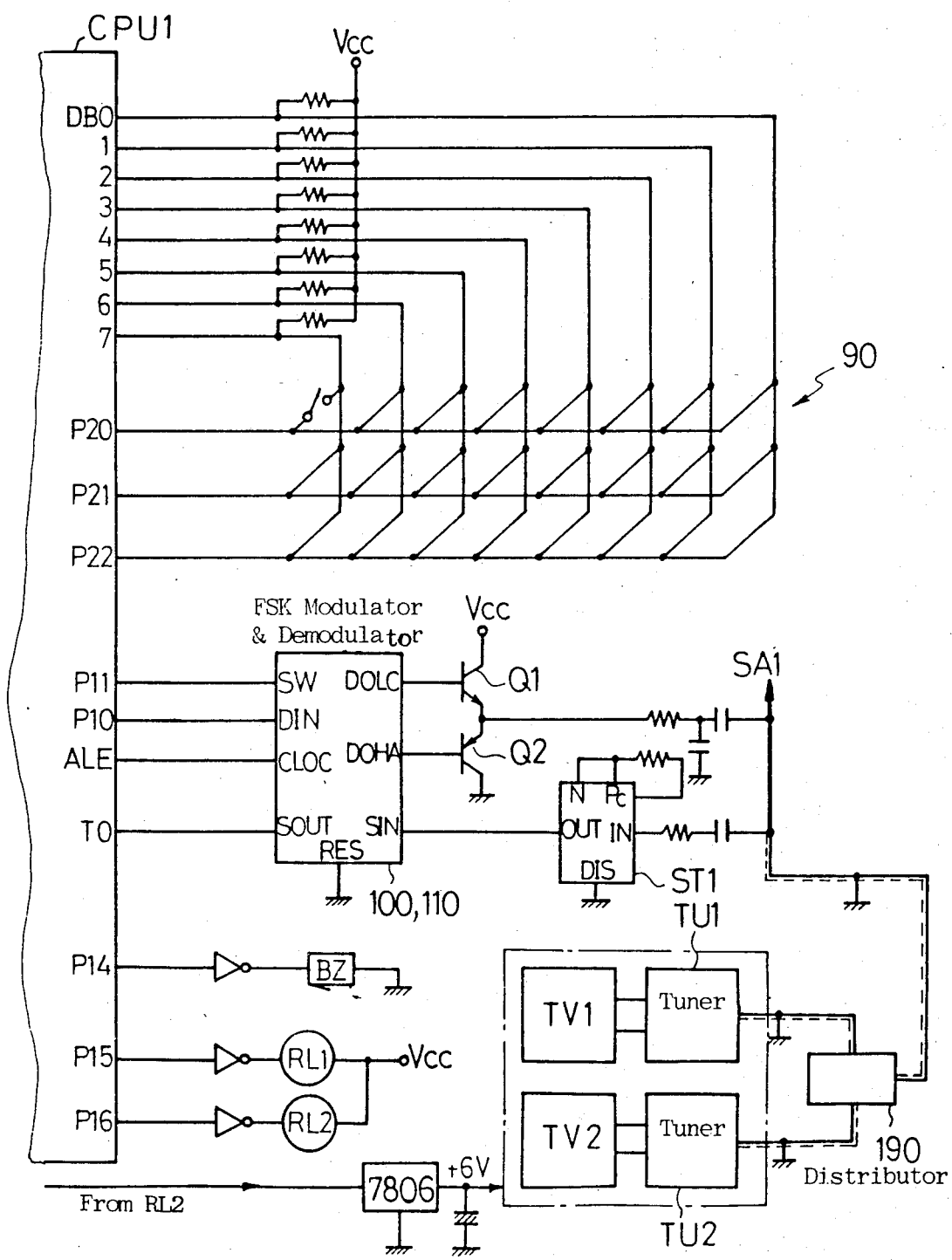

FIGS. 3a and 3b show the constitution of an electric circuit included in the steering control board. Now referring to FIGS. 3a and 3b, the key switch 90 comprises a number of key switches which are connected to three output ports P20, P21 and P22 of the microcomputer CPU1 as well as eight input ports DB0 to DB7 thereof in the form of a matrix. Contacts of these key switches are opened and closed by actuating the predetermined parts on the control panel 5.

In the illustrated embodiment, the FSK modulation/demodulation circuits 100, 110 are formed of a 1-chip integrated circuit and their internal structure is shown in FIG. 3c in more detail. Designated at 100 is an FSK modulator and 110 is an FSK demodulator. Note that Z1, Z2 and Z3 incorporated in the FSK modulator/demodulator 100, 110 designate counters having functions equivalent to those of MC14040, MC14018 and MC14040 made by Motorola Co., respectively. Other elements are formed of D-type flip-flops, J-K flip-flops, NAND gates, inverters, etc. which are generally used in the art.

A terminal CLOC is an input terminal for clock pulses to determine the reference timing of transmission, a terminal DIN is an input terminal for the binary data to be sent, a terminal SW is an input terminal for a signal to control output of an FSK signal, terminals DOLC and DOHA are output terminals for modulated signals, a terminal SIN is an input terminal for an FSK signal, and a terminal SOUT is an output terminal for the demodulated binary data.

The terminals COLC, DIN, SW and SOUT of the FSK modulator/demodulator 100, 110 are connected to ports P11, P10, ALE and T0 of the CPU1, respectively, and complementary output transistors Q1, Q2 are connected to the modulated signal output terminals DOLC, DOHA. An output line from the transistors Q1, Q2 is connected to the transmission path led to the slip ring SA1 via a resistor and a capacitor. The FSK signal input terminal SIN of the modulator/demodulator 100, 110 is connected to a Schmitt trigger ST1. An input terminal of the ST1 is connected to the transmission path led to the slip ring SA1 via a capacitor and a resistor.

A buzzer BZ is connected to an output port P14 of the microcomputer CPU1 via an inverter, while relays RL1 and RL2 are connected to output ports P15 and P16 thereof via inverters, respectively.

Two output terminals of the distributor 190 are connected to tuners TU1 and TU2 which in turn are connected to the monitor TV sets TV1 and TV2, respectively. The tuners TU1 and TU2 are tuned in the frequencies of radio frequency signals output from the modulators 210 and 220, respectively. An input terminal of the stabilized power supply circuit adapted to feed electric power to the tuners TU1, TU2 as well as the monitor TV sets TV1, TV2 is connected to the power supply line via the contact of the relay RL2.

The contact of the relay RL1 is connected to an input terminal of the stabilized power supply adapted to feed electric power to an audio signal circuit and a 12 V power supply line.

The microphone MC1 and MC2 are connected to the differential amplifier DFA made of an operational amplifier. A high pass filter HPF made of an operational amplifier is connected to an output terminal of the differential amplifier DFA. A low pass filter LPF made of an operational amplifier is connected to an output terminal of the HPF. An output signal from the low pass filter LPF is amplified by the amplifier AMP and then applied to an input terminal Audio-in of the FM modulator FMM via a capacitor. Also applied to the input terminal Audio-in of the FMM is a predetermined DC bias voltage through a variable resistor VR1. The variable resistor VR1 serves to set the central frequency of an FM modulated wave. The FM modulator FMM is formed of a 1-chip integrated circuit, and the FM modulation circuit 95 comprises the FMM and an electric coil, capacitors, resistors, etc. which are connected to the corresponding terminals thereof. An output terminal of the FM modulator FMM is connected to the transmission path led to the slip ring SA1 via a capacitor.

Figure 4A:
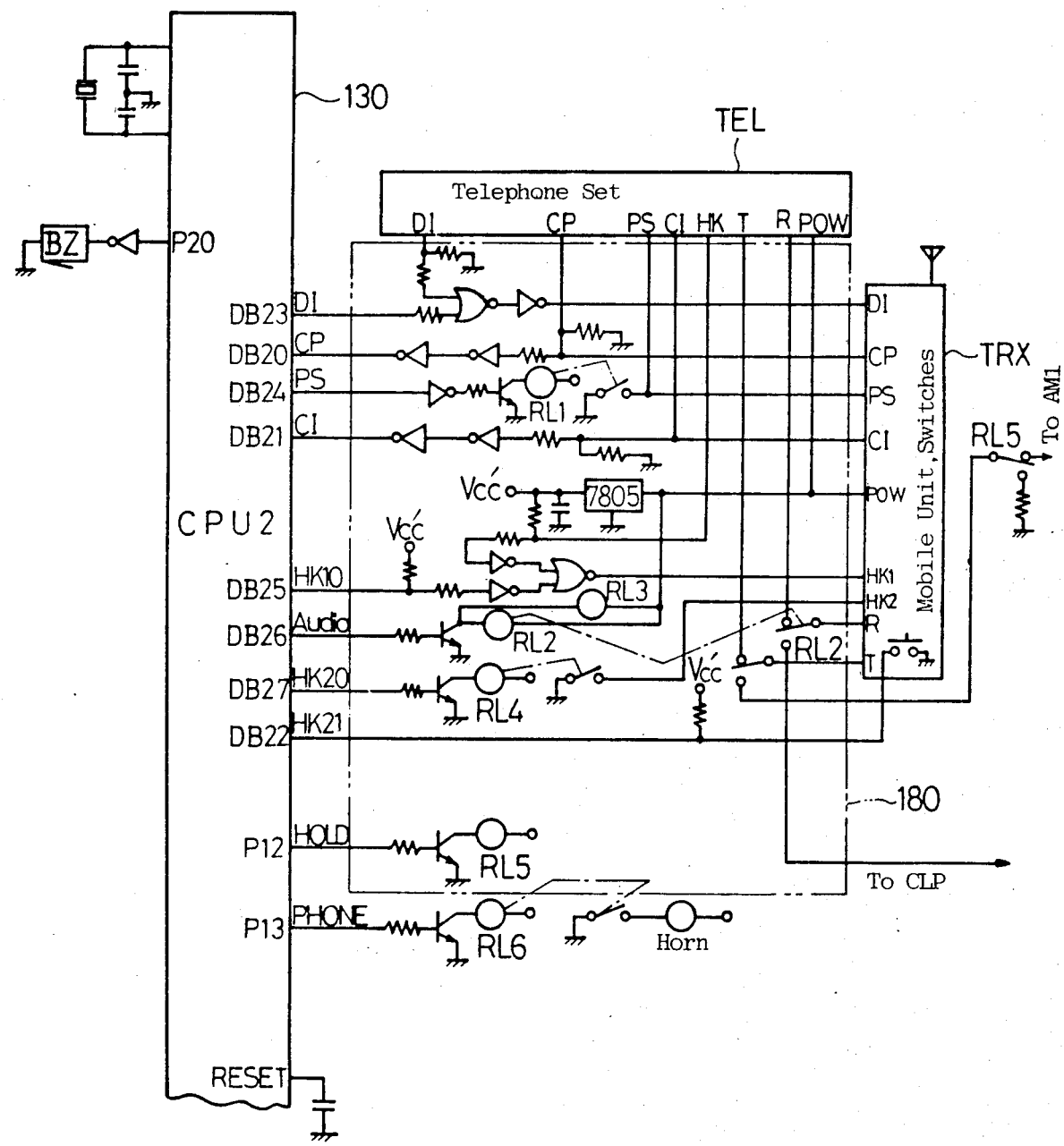
FIGS. 4a, 4b and 4c are block diagrams showing an electric circuit of the device in FIG. 1, which is included on the vehicle body side.
Figure 4B:
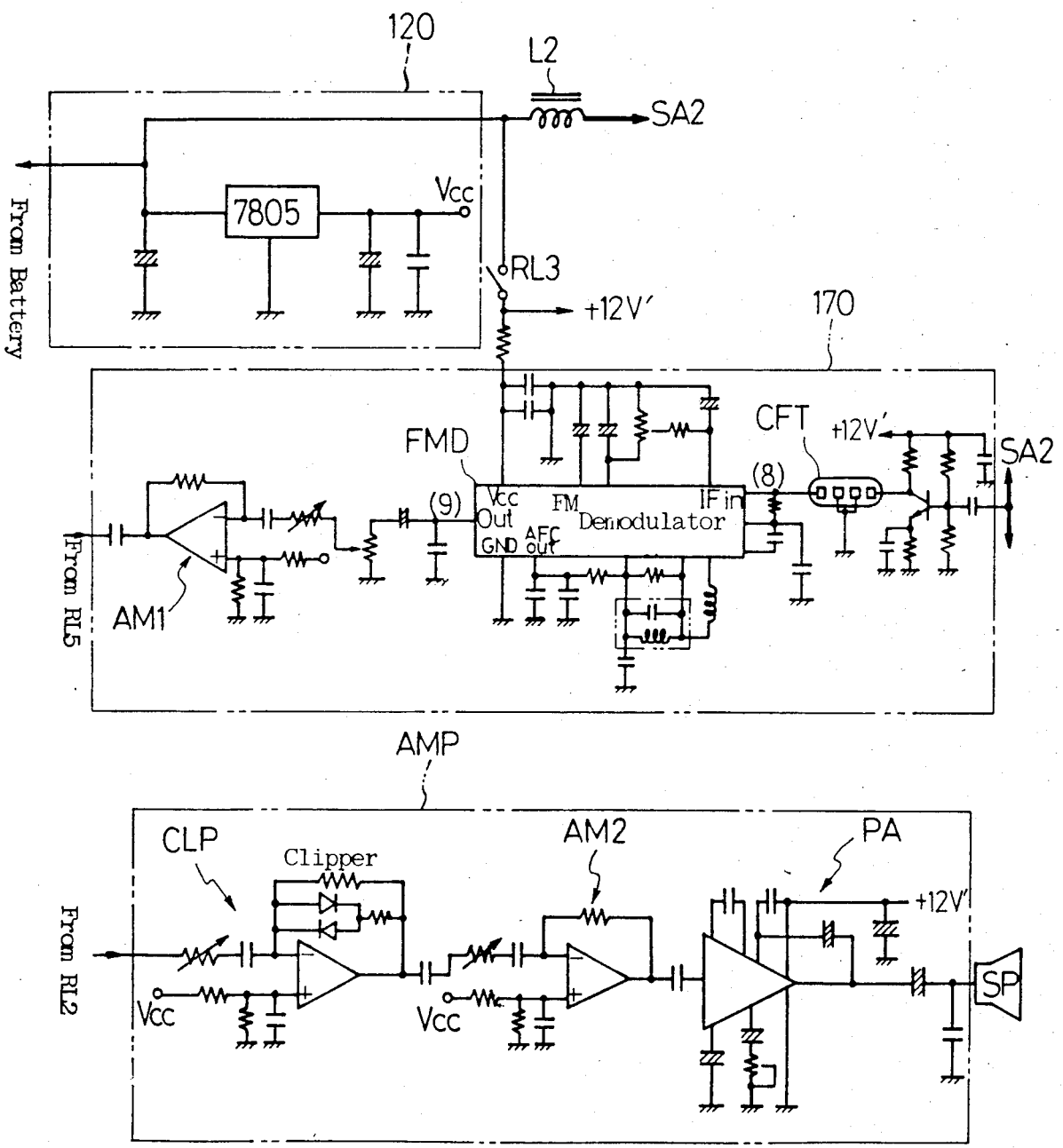
Figure 4C:
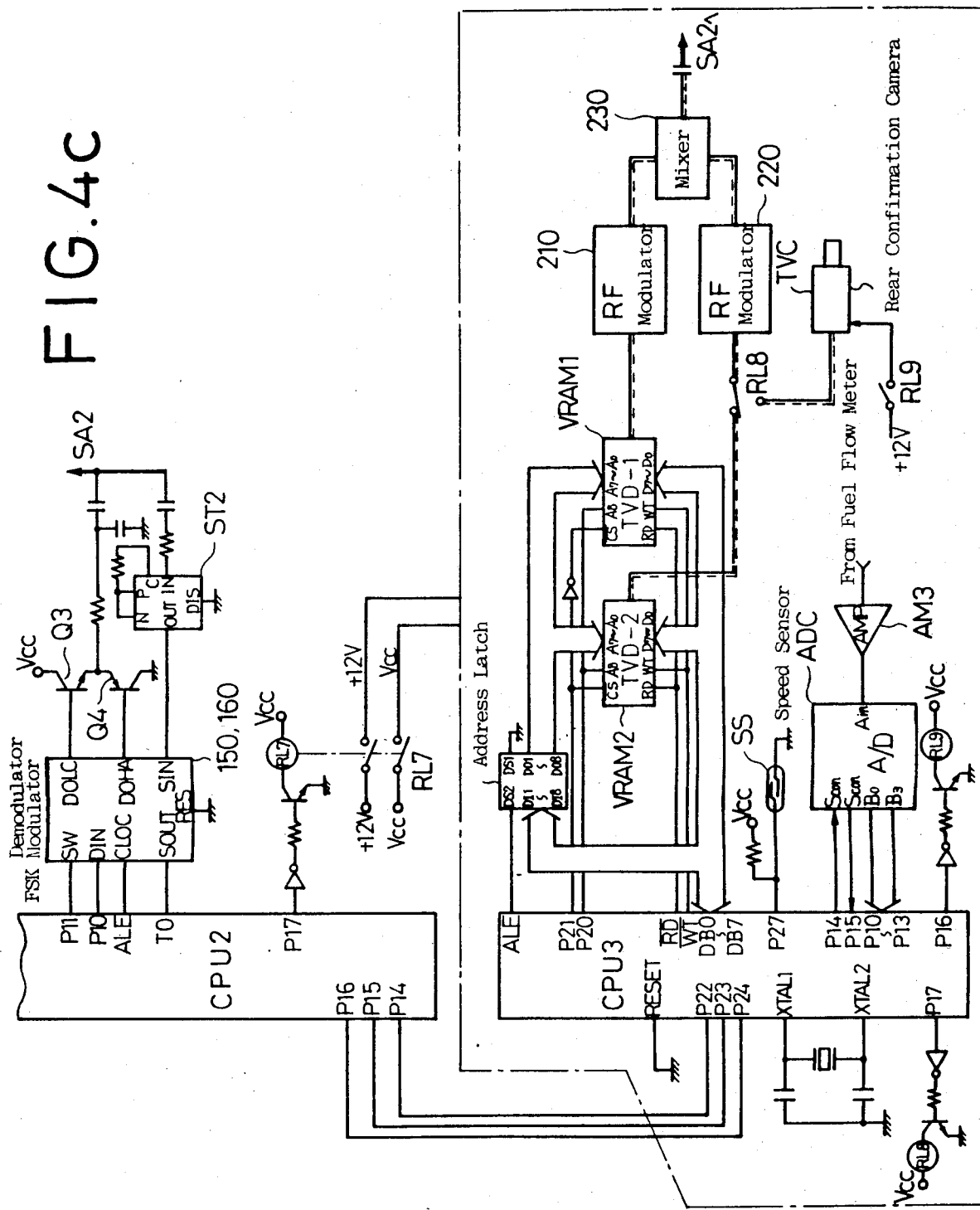

FIGS. 4a, 4b and 4c show an electric circuit included in the device on the vehicle body side. Now referring to FIGS. 4a, 4b and 4c, the FSK modulator/demodulator 150, 160 of the same structure as the modulator/demodulator 100, 110 shown in FIG. 3c are connected to the microcomputer CPU2. An output terminal of the FSK modulator 150 and an input terminal of the FSK demodulator 160 are connected to the slip ring SA2 via an output circuit including a driver and an input circuit including a Schmitt trigger, respectively.

An input terminal of the FM demodulation circuit 170 is connected to the slip ring SA2. The FM demodulation circuit 170 comprises a ceramic filter CFT, an integrated circuit FMD for demodulating FM signals, an audio frequency amplifier AM1, etc. Source power for the FM demodulation circuit 170 is supplied via the contact of a relay RL3. An output terminal of the FM demodulation circuit 170 is connected to the contact of a relay RL5.

The amplifier AMP connected to the speaker SP comprises a clipper CLP, an audio frequency amplifier AM2 and a power amplifier PA. The power amplifier PA is constituted in the output transformer-less (OTL) form. An input terminal of the amplifier AMP is connected to one contact of a relay RL2.

Connected to other ports of the microcomputer CPU2 are the branch connection circuit 180, a transistor adapted to control a relay RL6 for driving a horn, an inverter adapted to control a relay RL7 and an inverter for driving the buzzer BZ, correspondingly. The telephone set TEL, the mobile unit TRX, the FM demodulation circuit 170 and the amplifier AMP are connected to the branch connection circuit 180.

As to the block of the telephone set TEL, designated at DI is a dial code output terminal, CP is an output terminal for clock pulses of 1200 baud, PS is an input terminal for control of power-on/off, CI is an input terminal for a restriction command signal ("0": making talk possible, "1": making talk impossible), HK is an output terminal for a hook signal (on-hook/off-hook), T is an output terminal for an audio signal to be sent, R is an input terminal for an audio signal to be received, and POW is a power supply terminal. As to the mobile unit TRX, both HK and HK2 are input terminal for hook signals. The branch connection circuit 180 includes therein the relays RL1, RL2, RL3, RL4 and RL5 which are under control of the microcomputer CPU2.

Two video RAM's VRAM1, VRAM2 are connected to the microcomputer CPU3. The CPU3 controls output of the address data as well as input/output of the data through ports DB0 to DB7. The address data is latched by a signal from the port ALE and then applied to address ports of both VRAM1 and VRAM2. Upon arrival of a writing command signal WT or a reading command signal RD from the CPU3, both VRAM1 and VRAM2 make writing into or reading from the memory corresponding to the address specified at that timing. Either one of VRAM1 and VRAM2 is selected in accordance with a level of the signal from a port P21 of the CPU3.

As generally well known, the video RAM's (VRAM1, VRAM2) serve to generate TV scan synchronizing signals, read out the memory data sequentially from different addresses at the predetermined timing in synchronous relation with those signals, and to output the memory data as picture signals. Therefore, exchange of the data in the built-in memory leads to variation in the state of the picture signal to be output, so that there can be generated a TV picture signal to indicate any desired numeral, character, etc. by writing the given data into the predetermined address of the memory. Both picture signals and synchronizing signals thus generated are applied to the modulator 210 or 220, and the resultant high frequency modulated signals are output to the transmission path 250 via a mixer 230, etc.

Output from the VRAM1 is directly applied to the modulator 210, while output from the VRAM2 is applied to the modulator 220 via the contact of a relay RL8. Applied to a signal input terminal of the modulator 220 is either output from the VRAM2 or output from the TV camera TVC for rear confirmation selectively in accordance with the condition of the contact of the relay RL8.

To an input port P27 of the CPU3 there is connected a lead switch SS which is connected to a speed meter cable of the vehicle and positioned adjacent to a permanent magnet revolving at a rate corresponding to the vehicle speed. An analog/digital converter ADC is connected to ports P10 to P15 of the CPU3, and an output terminal of an amplifier AM3 connected to a fuel meter is connected to an input terminal of the ADC. Connected to output ports P16 and P17 of the CPU are drivers for driving the relays RL9 and RL8, respectively.

The ports P14, P15 and P16 of the microcomputer CPU2 are interconnected with the ports P22, P23 and P24 of the CPU3, so that both CPU2 and CPU3 may transmit signals such as commands or data to each other through these ports. Power source for the microcomputer CPU3 and its peripheral circuit (display circuit system) is turned on/off by the CPU2.

Operation of the FSK modulation circuit 100 will be briefly described by referring to FIGS. 3a to 3c. Applied to its input terminal CLOC is pulse signal (clock pulses) with a constant period from the output port ALE of the microcomputer CPU1. The counter Z1 divides the frequency of the clock pulses so as to output two signals with periods different from each other. When the input terminal SW assumes a level (H) enabling output of FSK signals, either one of two output signals from the counter is selected in accordance with a level at the signal applied to the data input terminal DIN and hence levels at the output terminals DOLC and DOHA are varied corresponding to the period of the selected signal in a binary fashion.

With this signal, the transistors Q1 and Q2 are subject to on/off control and the capacitor is charged or discharged at the turning point of such on/off switching, so that there occurs a positive or negative signal in the transmission path. In other words, since the period of thus occurred signal is varied in accordance with a level of the signal set at the input terminal DIN of the modulator 100, the predetermined serial data set at the DIN permits the FSK signals corresponding to the serial data to be output to the transmission path. When the port P11 assumes a low level L, the transistors Q1 and Q2 are applied with a low level L and a high level H, respectively. In this condition, both transistors Q1 and Q2 are turned off together, so that there issues no FSK signal.

With FSK signals being present on the transmission path, the FSK signals of a predetermined amplitude appear at the output terminal of the Schmitt trigger ST1. The FSK demodulator 110 demodulates these signals and then applies binary signals in accordance with the period of the FSK signals to the input port T0 of the CPU1.

FIG. 5 shows schematic waveforms of the signals at the respective sections in the device of FIG. 1. In the illustrated embodiment, a plurality of signals are carried through a single transmission path in a superimposed fashion as will be seen from FIG. 5. It is also assumed in this embodiment that frequencies of the FSK signals are 500 KHz and 100 KHz, the center frequency of the FM signal (audio modulated signal) is 10.7 MHz, and frequencies of the signals output from the modulators 210 and 220 are set at the frequencies of TV channels different from each other.

Between the FSK demodulators and the transmission path there are disposed the Schmitt triggers ST1 and ST2 which function to remove those signal components other than the FSK signals as well as noises, so that only the FSK signals extracted out of a number of signals are applied to the FSK demodulators. Further, the FM demodulation circuit 170 includes therein the ceramic filter (band path filter) CFT, which functions to extract the FM signal (audio modulated signal) components. Moreover, the tuners TU1 and TU2 include therein tuning circuits functioning to extract those signal components which have the corresponding predetermined frequencies, thereby to demodulate the high frequency signal components from the modulators 210 and 220 and then apply the resultant components to the monitor TV sets TV1 and TV2, respectively.

Although both signal voltage and DC voltage for power feeding are applied to the transmission path 250 at the same time, there occurs no disadvantageous problem because the signal system is so arranged that the output terminal of each modulator and the input terminal of each demodulator are connected to the transmission path 250 via capacitors. In addition, although the battery and the power supply circuits 70, 120 have low impedance, the electric coils L1 and L2 have high impedance against high frequency signals and they are connected to the battery and the power supply circuits 70, 120 in series, so that the impedance of the transmission path 250 becomes relatively high when viewed from each modulation circuit and each demodulation circuit.

Figure 6:
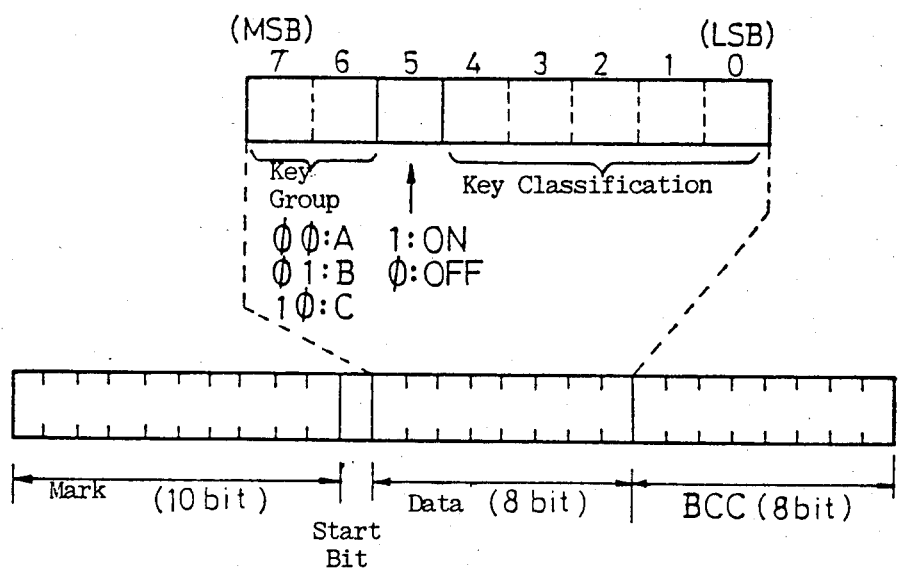
FIG. 6 is a plan view showing the constitution of a data train of a (FSK) signal transmitted by the device of FIG. 1.

FIG. 6 shows the bit structure of a transmitted signal which is applied to the FSK modulation circuits 100, 150 in this embodiment by the microcomputers 80 and 130. Now referring to FIG. 6, the transmitted signal comprises a mark signal (high level: "1") of 10 bits at the head, a subsequent start bit of 1 bit, data of 8 bits and a BCC code. As to the 8-bit data, bits 0 to 4 represent the classification of keys, a bit 5 represents on/off of keys ("1": on, "0": off), and bits 6, 7 represent the group of keys. In this embodiment, keys are divided into three groups; A group indicated by "00", B group indicated by "01", and C group indicated by "10".

Referring to FIG. 2b, the key group A includes numeral keys (0 to 9), a # key, a * key, a clear key CLR and a hold key HOLD, the key group B comprises a horn key, and the key group C includes a rear confirmation key, a fuel key, a vehicle speed indicating key (i.e., Speed) and a call/off key CALL/OFF.

Figure 7:
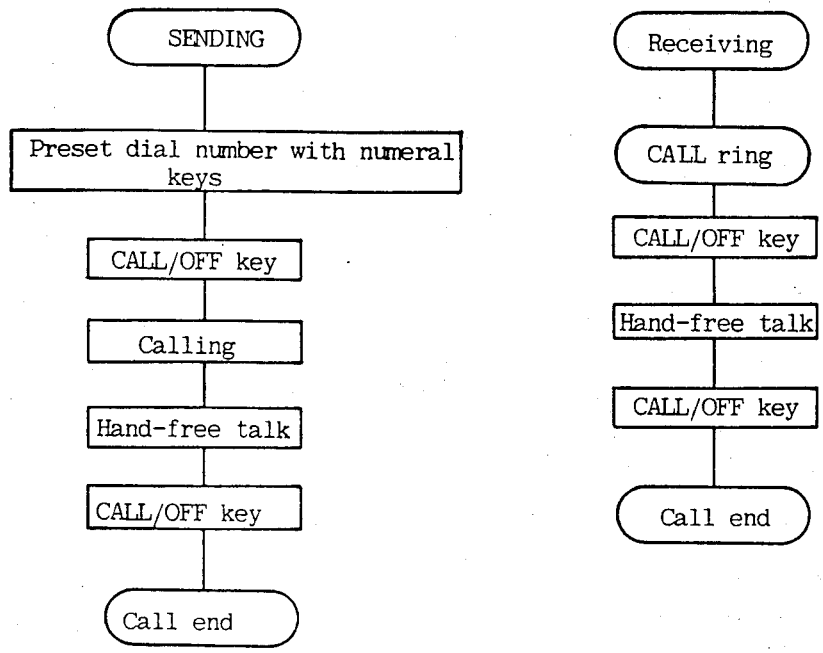
FIG. 7 is a flow chart showing both schematic sending and receiving operations in case that the device of FIG. 1 is used to speak over a telephone set included therein.

FIG. 7 shows schematically the operations of the device in case of actuating both sending and receiving modes of the vehicle-loaded telephone set from the steering control board. Description will be made by referring to FIG. 7.

Sending Operation

The telephone number of the other party is input using the numeral keys, the * key and the # key on the steering control board. This causes the microcomputer to store the key-in telephone number.

It waits for pressing of the call/off key CALL/OFF.

When the call/off key CALL/OFF is pressed, the other party corresponding to the stored telephone number is called automatically. If the other party under calling raises up the receiver (i.e., takes off the hook), there comes into a condition enabling hand-free talk. It is to be noted that, with the hold key HOLD being pressed at this time, the relay R5 is actuated to disconnect the transmitter, that is, the microphones MC1 and MC2 on the steering wheel, from the mobile unit TRX, whereby voices will not be transmitted from the vehicle.

When the call/off key CALL/OFF is pressed once again, this is judged as the completion of talk, thus ending the communication.

Receiving Operation

When the vehicle-loaded telephone set is called by the other party, there rings a calling tone.

It waits for pressing of the call/off key CALL/OFF.

When the call/off key CALL/OFF is pressed, there comes into the same condition as that the receiver has been raised up in the normal case, with a result that voices from the other party are output through the speaker SP and the microphones MC1, MC2 on the steering control board are connected to the vehicle-loaded telephone set as a transmitter. When the call/off key CALL/OFF is pressed once again, this is judged as the completion of talk, thus ending the communication.

Figure 8A:
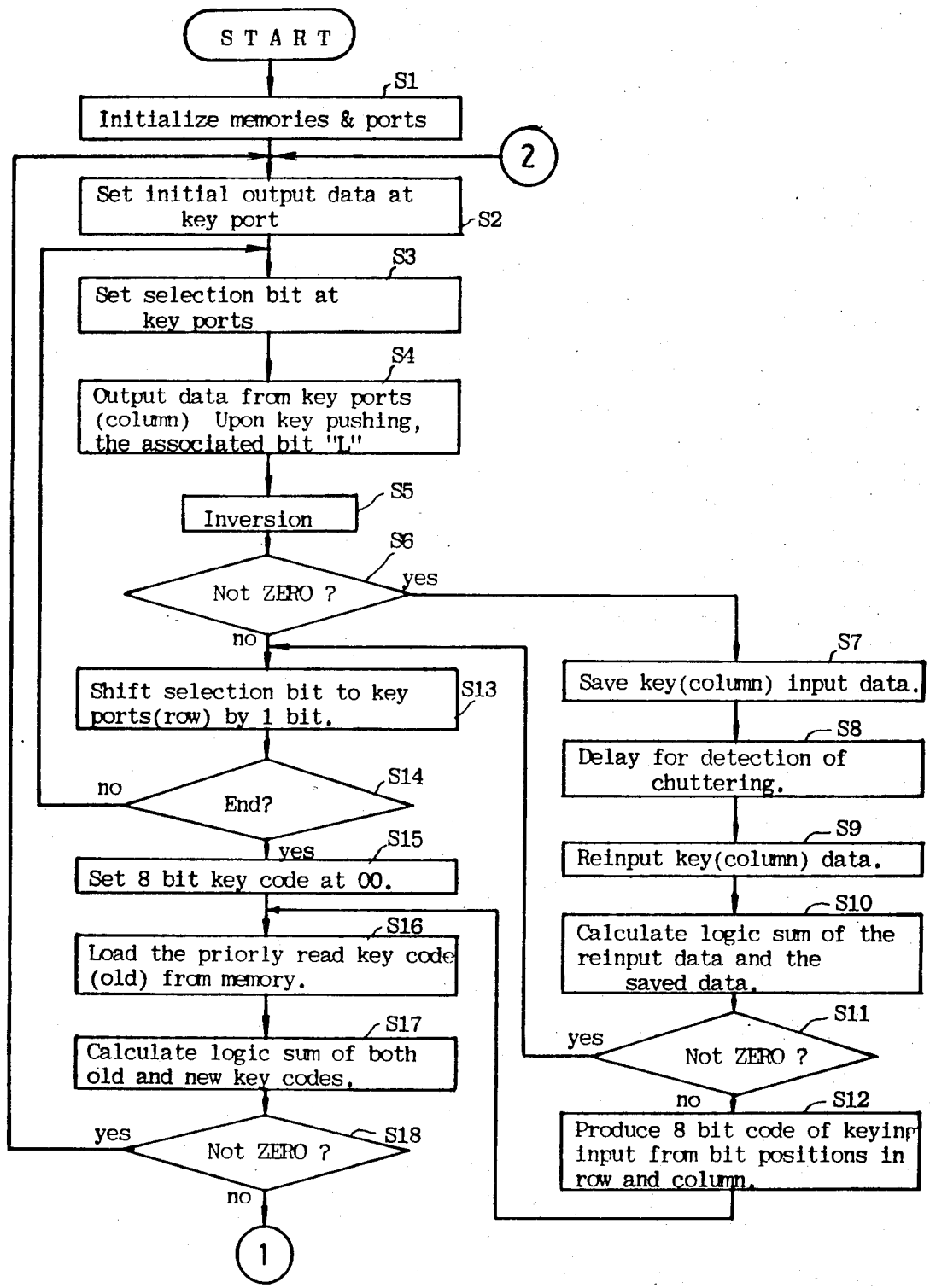
Figure 9B:
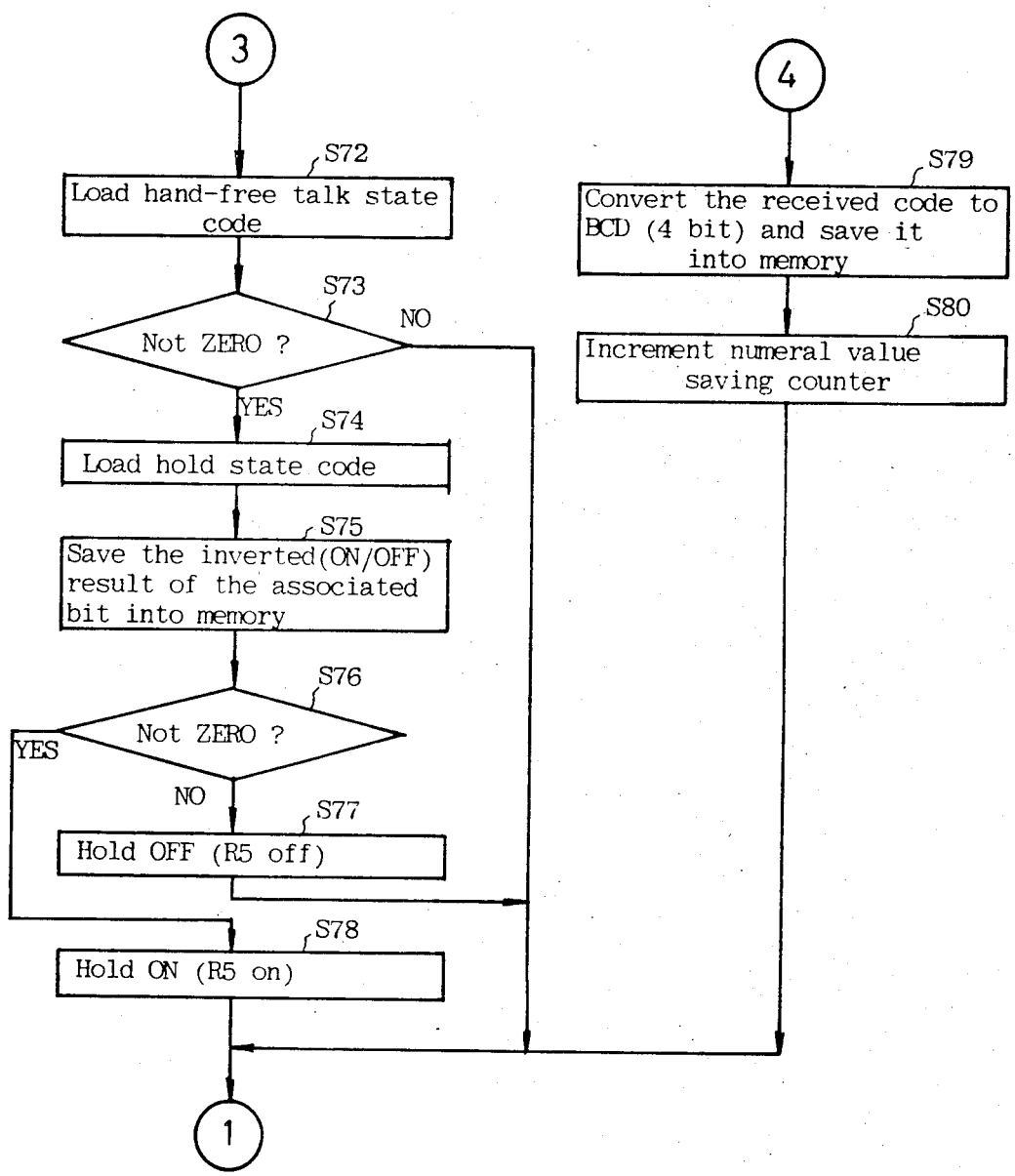
Figure 9C:
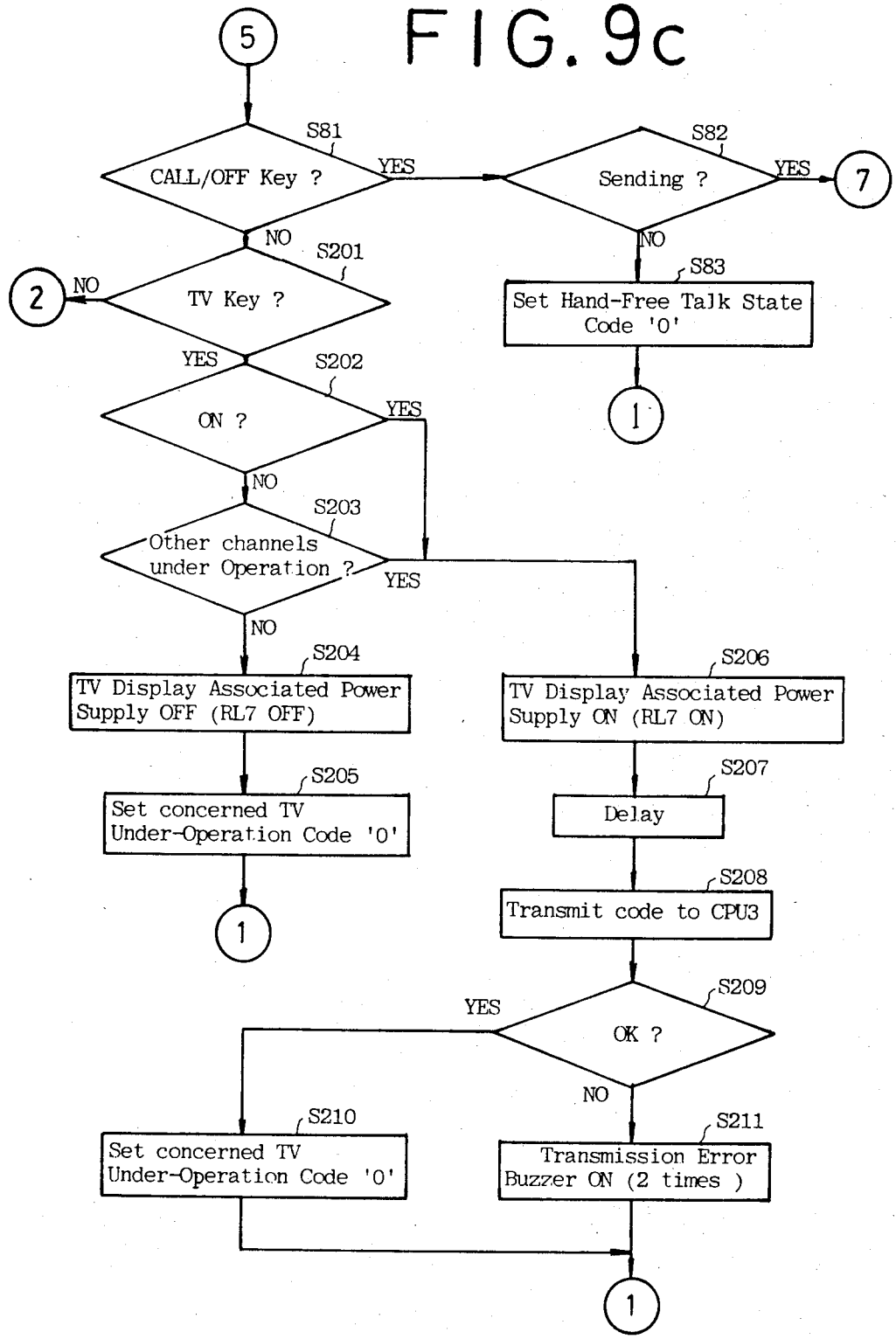
Figure 9D:
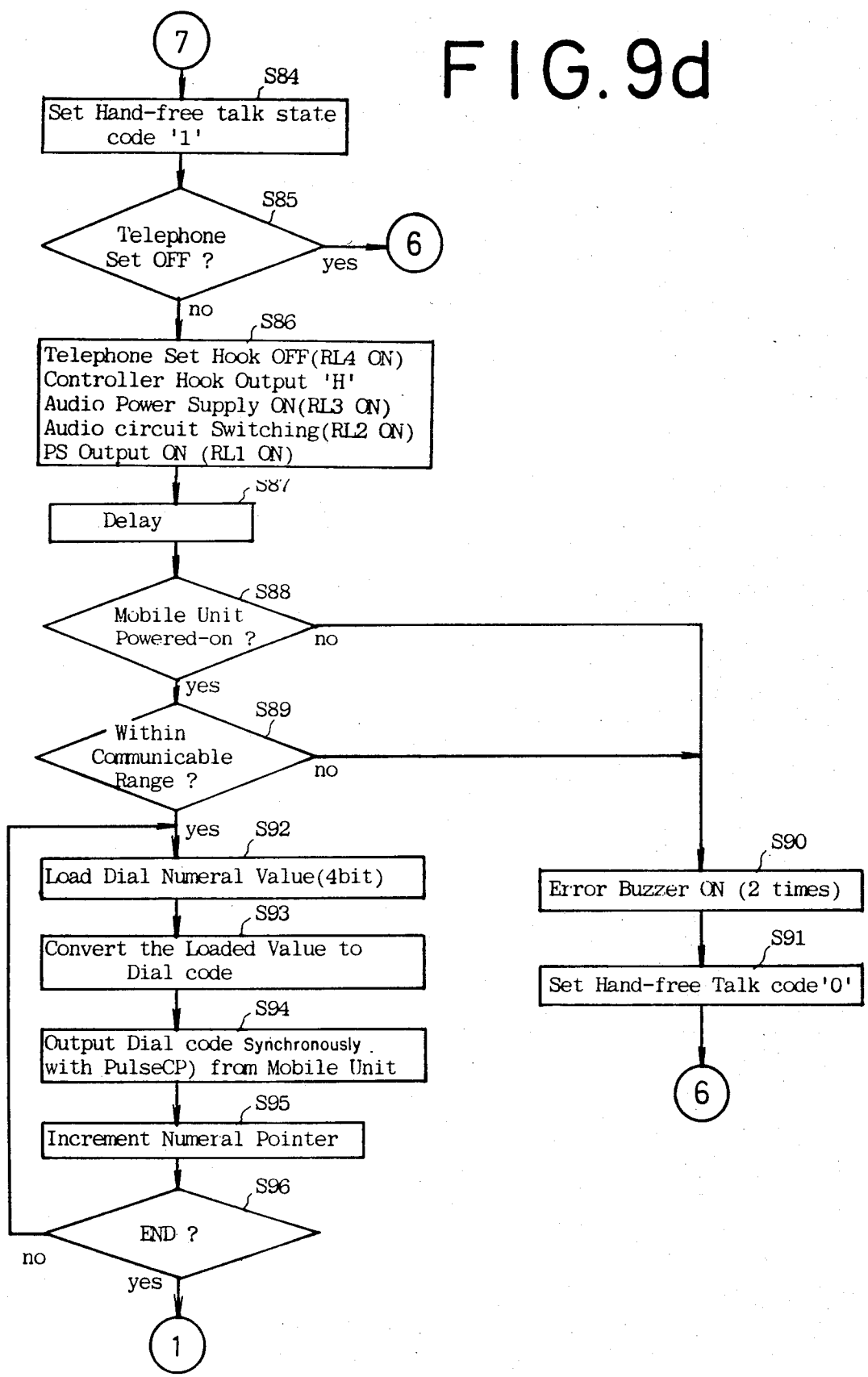

FIGS. 8a and 8b show the operation of the steering control board as shown in FIGS. 3a and 3b. The operation of each step performed in the steering control board will be now described by referring to FIGS. 8a and 8b.

S1 The condition at each output port of the microcomputer 80 is set to an initial level with the content of the memory being assumed as an initial value. With this processing, the output port P11 is set to a low level L and hence output of FSK signals is inhibited.

S2 The data to be output to the key reading signal output ports, i.e., P20, P21 and P22, are set to initial values. These initial data are selected such that those bits which correspond to the output ports connected to row lines of the key matrix for starting reading-out assume "0" (i.e., a low level L) and other bits assume "1" (i.e., a high level H). In this embodiment, the initial setting is so made that the bit corresponding to the port P20 assumes "0", while the bits corresponding to the ports P21 and P22 assume "1".

S3 The predetermined data are output to the ports P20, P21 and P22. With this, any of the ports P20 to P22 becomes a low level L and the remaining ports become a high level H.

S4 Levels at the input ports DB0 to DB7 connected to column line of the key matrix are read out. Referring to FIG. 3b, the input ports DB0 to DB7 are pulled up to the power supply line Vcc together via resistors and the individual keys are connected in the matrix form between the output ports P20 to P22 and the input ports DB0 to DB7, so that, when a key 0, for example, in the key matrix 90, levels at the input ports DB0 to DB7 are respectively set to L, H, H, H, H, H, H and H at the timing that the output port P20 is set to a low level L.

S5  The value 1/0 of each bit of the data read out in the step S4. In other words, the complement of each bit value is obtained.

S6  The key reading data read out in the step S5 are compared with the value 0. If the data equals to the value 0, this means the absence of key-in operation and hence the flow is forwarded to the step S13. Otherwise, it is forwarded to the step S7.

S7  The key reading data is saved (stored) in the predetermined memory.

S8  To avoid an influence of mechanical vibrations at the key contact, i.e., chattering, it waits for a predetermined period of time (e.g., 10 msec) until the vibrations will be attenuated sufficiently.

S9  Levels at the ports DB0 to DB7 are read out once again.

S10  Logical sum of the value read out in the step S9 and the value saved in the memory in the step S7 is calculated for each bit.

S11  It is checked whether the calculated result in the step S10 is 0 or not. If not 0, this judged as the absence of key-in operation and hence the flow is forwarded to the step S13. Otherwise, it is forwarded to the step S12.

S12  A 8-bit key code corresponding to the pressed keys are produced from not only those bits in the key reading row signal data issued to the output ports P20, P21 and P22 which assume data "0", but also the data read out from the ports DB0 to DB7.

S13  Those bits in the key reading row signal data issued to the output ports P20 to P22 which assume data "0" are shifted to the adjacent bits.

S14  It is checked whether the key reading scan has been once completed or not. If not completed, the flow returns to the processing from the step S3.

S15  Since there exists no key-in operation, the 8-bit code 00H (in hexadecimal notation) is assumed as a key code.

S16  The key code at the previous key reading scan is loaded from the memory.

S17  Logical sum of the previous key code loaded in the step S16 and the new key code obtained at the present key reading scan is calculated for each bit.

S18  It is checked whether the calculated result is 0 or not. If 0, i.e., there exists no key-in operation, the flow returns to the step S2. Otherwise, it is forwarded to the step S19.

S19  The newly produced key code is stored in the memory at the predetermined address.

S20  It is checked whether the key code belongs to the key group A or not.

S21  It is checked whether the key is pressed or released. Since the keys belonging to the group A, i.e., the numeral keys, * key, # key, clear key CLR and the hold key HOLD, are effective only when pressed, the step S21 is jumped to the step S2 in case that those keys are released.

S22  The buzzer is buzzed one time for confirmation of the key-in operation.

S23  It is checked whether the pressed key belongs to the group B or not. The key of the group B, i.e., the horn key, is made effective in both cases when pressed and released.

S24  The data of the produced key code is sent out to the transmission path to inform the device on the vehicle body side of the presence of key-in operation. This processing will be described later in detail.

S25  It is checked whether or not the data has been sent correctly through the data transmission in the step S24.

S26  It is checked whether the pressed key belongs to the group C or not. The keys belonging to the group C, i.e., the rear confirmation key, fuel key, vehicle speed indicating key and the call/off key, transmit the data resulted from inversion of an on/off state of the keys, every when pressed.

S27  The data indicating an on/off state of the keys in the group C is loaded from the memory.

S28  The new key code representing the inverted on/off state of the keys in the group C is produced from both the key code and the data loaded in the step S27. For instance, if the state of the call/off key is turned on at the previous key-in operation, the key code data representing an off state of the call/off key is produced by the key-in operation at the present time.

S29  Identical to the step S24.

S30  It is checked whether the data has been sent correctly or not through the data transmission in the step S29.

S31  The content of the memory for storing the on/off state of the keys in the group C is inverted.

S32  The relay RL1 connected to the output port P15 of the microcomputer 80, the relay RL2. The buzzer BZ, etc. are subject to on/off control in accordance with the state of the keys in the group C. With this, the FM modulation circuit 95 and the display circuit (TV1, TV2, TU1, TU2) are controlled.

S33  Since there occurs an error in the data transmission, the buzzer BZ is buzzed two times so as to inform the driver of occurrence of such error.

S34  Since there occurs an error in key reading, the buzzer BZ is buzzed three times so as to inform the driver of occurrence of such error.

FIGS. 9a, 9b, 9c and 9d show the operation of the microcomputer CPU2 (130). Each operation step will be now described by referring to FIGS. 9a, 9b, 9c and 9d.

S51  The condition at each output port of the microcomputer CPU2 is set to an initial level with the content of the memory being assumed an initial value. With this processing, the output port P11 is set to a low level L and hence output of FSK signals is inhibited.

S52  It is checked whether the receiver of the telephone set TEL is off or not.

S53  Since the receiver of the telephone set TEL is off, H is applied to the outout port HK20 to turn the relay RL4 on, H is applied to the output port HK10, and L is applied to the output port Audio to set both relays RL2 and RL3 off. This permits the telephone set TEL to be used in a similar manner to the usual vehicle-loaded telephone set.

S54  The content of the memory for storing the command of hand-free talk from the steering control board is loaded.

S55  It is checked whether the hand-free talk is instructed or not. In the initial state where the hand-free talk is not yet instructed the flow is forwarded to the step S57. But, when the call/off key CALL/OFF on the steering control board is turned on (i.e., CALL), this means instruction of the hand-free talk and hence the flow is forwarded to the step S56.

S56  H is applied to the output port HK20 to turn the relay RL4 on, H is set at the output port HK10, H is applied to the output port Audio to turn both relays RL2 and RL3 on, and L is applied to the output port PS to set the relay RL1 on. With this, both telephone set TEL and mobile unit TRX are powered-on, the FM demodulation circuit 170 is powered-on, and the amplifier AMP is connected to an audio receiving line of the mobile unit TRX.

S57  L is applied to the output port HOLD to turn the relay RL5 off, L is applied to the output port HK20 to turn the relay RL4 off, L is set at the output port HK10, L is applied to the output Audio to turn both relays RL2 and RL3 off, and H is applied to the output port PS to turn the relay RL1 off. With this, the telephone set TEL, mobile unit TRX as well as the FM demodulation circuit 170 are powered-off, and the telephone set TEL is connected with the mobile unit TRX.

S58  The data from the steering control board is received. This process will be described later in detail.

S59  It is judged whether the data transmission to be generated upon key-in operation on the steering control board has been reached actually from the steering control board.

S60  It is judged whether the transmitted data represents or not the key code corresponding to the group A.

S61  It is judged whether the key code indicates the numeral keys, the * key or the #key.

S62  It is judged whether the key code indicates the hold key HOLD or not.

S63  It is judged whether the key code indicates the clear key CLR or not.

S64  An address counter of the memory for storing key codes from the numeral keys having been transmitted until that time is cleared. Namely, the input operations with the numeral keys until that time are cancelled.

S65  It is judged whether the key code represents the group B or not.

S66  It is judged whether the key code corresponds to the horn key or not.

S67  Does the key code instruct the key switch to be on?

S68  Since the horn key is released, the horn is set off.

S69  Since the horn key is pressed, the horn is set on.

S70  It is checked whether the key code represents the group C or not.

S71  Since the key code received as data does not indicate any of the groups A, B and C, this is judged as an error in data receiving and then the buzzer BZ is buzzed three times.

S72  The content of the memory for storing the command of hand-free talk from the steering control board is loaded.

S73  It is checked whether the data loaded in the step S72 instructs the hand-free talk or not.

S74  The content of the memory for storing the command from the hold key HOLD is loaded.

S75  The value 1/0 (i.e., on/off) in S74 is inverted and the resultant data is stored in the same previous memory. Thus, with no hold command in advance, the predetermined bit in the data is set to "1", i.e., hold instruction.

S76  It is checked whether the hold instruction is made or not.

S77  Since the hold release is commanded, L is applied to the output port HOLD to set the relay RL5 off. With this, the signal output terminal of the FM demodulation circuit 170 is connected to an transmitted voice input terminal T of the mobile unit TRX, thus permitting to talk with the microphones MC1, MC2 on the steering wheel.

S78  Since the hold instruction is made, H is applied to the output port HOLD to set the relay RL5 on. This causes the output terminal of the FM modulation circuit 170 to be disconnected from the mobile unit TRX.

S79  Since the key code with the numeral keys have arrived, such code is converted into the BCD (Binary Coded Decimal) code corresponding to the numerals of the pressed numeral keys and then this BCD code is stored in the memory at the predetermined address.

S80  The content of the counter for instructing the address of the memory adapted to store the BCD code in accordance with the pressed numeral keys is incremented.

S81  It is checked whether the key code coming from the steering control board indicates the operation of the call/off key CALL/OFF or not. If not the call/-off key, the step S201 will be executed.

S82  It is judged whether the key code indicates the on (CALL) state of the call/off key or not.

S83  Since the call/off key is set at OFF, the content of the memory for storing the command of hand-free talk is set to "0" (release of hand-free talk).

S84  Since the call/off key is set at CALL, the content of the memory for storing the command of handfree talk is made "1" (hand-free talk on).

S85  It is checked whether the receiver of the telephone set TEL is off or not.

S86  H is applied to the output port HK20 to turn the relay RL4 on, H is set at the output port HK10, H is applied to the output port Audio to turn both relays RL2 and RL3 on, and L is applied to the output port PS to set the relay RL1 on. With this, both telephone set TEL and mobile unit TRX are powered-on, the FM demodulation circuit 170 is powered-on, and the amplifier AMP is connected to the voice receiving line of the mobile unit TRX.

S87  It waits for a period of time for the relays to be actuated and for the mobile unit to reach a predetermined operating condition from its power-on.

S88  It is checked whether the mobile unit TRX is powered-on or not.

S89  It is checked whether or not the vehicle locates in an area enabling communication (i.e., an electric wave can reach the other party). It is judged by checking whether or not the output terminal CI of the TRX is at a level permitting a talk.

S90  Since there occurs any trouble or the vehicle locates in an area disabling communication, the buzzer BZ is buzzed two times to inform the driver of error occurrence.

S91  The content of the memory for storing the command of hand-free talk is set to "0" (hand-free talk off).

S92  The content of the memory for storing the 4-bit BCD code corresponding to the numeral value input by the numeral keys is read out from the address specified by the numeral pointer (address counter) and then loaded in the predetermined register.

S93 The BCD obtained in the step S92 is converted into the same code as the dial code produced by the telephone set TEL.

S94 The dial code obtained in the step S93 is output to the DI terminal sequentially in synchronous relation with a pulse signal issued from the CP terminal of the mobile unit TRX.

S95 The value in the numeral pointer is incremented.

S96 It is checked whether all of the BCD codes are completely read out of the memory or not. This is judged by checking the value in the numeral pointer. If not completed, the program returns to the step S92 to read out the BCD code from the next numeral pointer.

S201 It is checked whether any of the keys associated with TV display, i.e., rear confirmation key, fuel key or vehicle speed indicating key, is pressed or not.

S202 It is judged whether the present key-in operation is to set on or off the indication.

S203 This step is executed in case of setting off the predetermined indication. It is judged whether or not any one or more of the rear confirmation indication, the fuel indication and the vehicle speed indication are set on (to be displayed) in addition to the indication being set off at that time.

S204 Since the rear confirmation indication, the fuel indication and the vehicle speed indication are all set off, the relay RL7 is set off and the power source supplied to the microcomputer CPU3 and the peripheral indication circuits thereof is shut down.

S205 Those of indication state memories respectively allocated to the rear confirmation indication, the fuel indication and the vehicle speed indication which have been set not to be displayed at that time, are set to "0" (non-display).

S206 Since it is instructed to make display, the relay RL7 is turned on and both CPU3 and its peripheral indication circuits are powered-on.

S207 It waits for until the microcomputer CPU3 will be able to receive the code, i.e., for a certain period of time required for the CPU3 to proceed from power-on to completion of initial setting thereof.

S208 The command code corresponding the indication set to be on is transmitted to the CPU3 using the ports P14, P15 and P16.

S209 It is checked whether or not the code sent by the CPU2 in the step S208 has been received correctly. More specifically, in response to sending of the code the CPU2 outputs a receiving completion code (i.e., acknowledge signal) after a certain period of time. Then, the CPU2 checks a level at the predetermined input port of the CPU2 so as to monitor whether the receiving completion code from the CPU3 will be received within such a certain period of time or not.

S210 Those of the indication state memories respectively allocated to the rear confirmation indication, the fuel indication and the vehicle speed indication which have been set to be displayed at that time, are set to "1" (during display).

S211 Since the predetermined acknowledge signal does not arrive within a certain period of time in response to sending of the command code from the CPU2, this is judged as occurrence of transmission error and then the buzzer is buzzed two times.

Figure 10A:
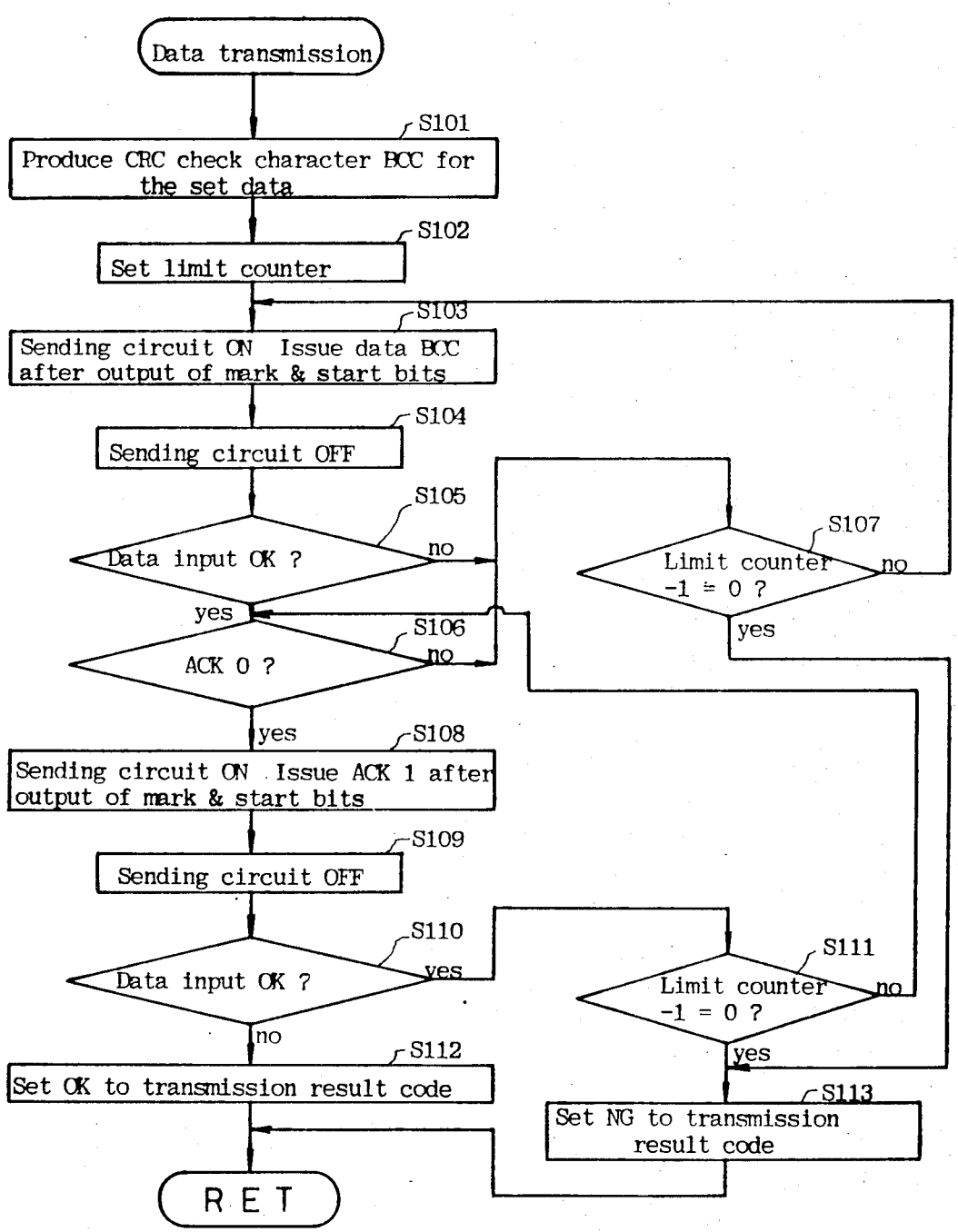
FIG. 10a is a flow chart showing the data transmitting (sending) operation of the microcomputer CPU1 in FIG. 1.

FIG. 10a shows data transmission (sending) operation of the microcomputer 80 in detail. Its operation steps will be now described in order by referring to FIG. 10a.

S101 An 8-bit CRC check character BCC is produced accordance with the data to be transmitted.

S102 A limit counter adapted to limit the number of data transmissions is set at a predetermined value.

S103 The output port P12 is set at H to permit output of the FSK signal. The respective bit data comprising the mark signal, start bit, transmitted data and the BCC code are set at the output port P11 in synchronous relation with the clocks.

S104 L is set at the output port P12 to inhibit output of the FSK signal.

S105 It is checked whether there is data input from the FSK modulation circuit on the other party side. If there is no data input, the flow is forwarded to the step S107.

S106 It is checked whether the data sent from the other party is an acknowledgment ACK0 indicating data receipt confirmation or not. As described later, upon receipt of the data the receiving side outputs ACK0 to the sending side.

S107 The value of the limit counter is decremented, and it is checked whether the resultant value is 0 or not. If not 0, the flow returns to S103, while if 0, it comes into S113.

S108 H is set at the output port P12 once again to permit output of the FSK signal. Then, the respective bit data comprising the mark signal, start bit and the acknowledgment ACK1 indicating confirmation of ACK0 are output sequentially in synchronous relation with the clocks.

S109 L is set at the output port P12 to inhibit output of the FSK signal.

S110 It is checked whether the FSK signal has arrived from the other party (receiving side) or not. As described later, the receiving side stops to output the FSK signal upon receiving an acknowledgment ACK1 from the sending side after dispatch of the acknowledgment ACK0. But, receiving no ACK1, the other party outputs the FSK signal including ACK0 once again. Accordingly, arrival of the FSK signal from the receiving side means herein that the data ACK1 from the sending side has not yet been received by the receiving side.

S111 Since the data ACK1 has not yet been received by the receiving side, the value of the limit counter is decremented and then it is checked whether the resultant value is 0 or not. If not 0, the flow is returned to the step S106 to transmit the data ACK1 once again, while if 0, it comes into the step S112 Since the data transmission has been completed within the predetermined number of times set in the limit counter, "OK" is set to the transmission result code.

S113 Although the data transmission has been performed in the predetermined number of times set in the limit counter, both data and acknowledgment ACK1 are not transmitted correctly. Thus, "NG" is set to the transmission result code.

FIG. 10b shows data receiving operation of the microcomputer 130 in detail. Its operation steps will be now described by referring to FIG. 10b.

S121 It is checked whether the FSK signal has been received or not, i.e., whether the data has arrived at the input port P13 or not.

P122   Since no data has arrived at the input port P13, the code corresponding to no data receipt is set in the data receiving memory.

S123   A predetermined value is set in the limit counter adapted to limit the number of data receiving operations in data transmission at one time.

S124   The CRC check character BCC is produced from the received data.

S125   Both BCC values produced from the received data and in the step S124 are compared with each other. If both values are equal, this is judged as that the data has been received correctly, and then the flow is forwarded to the step S128. Otherwise, it is forwarded to the step S126.

S126   Since there occurred an error, the limit counter is decremented and it is checked whether the resultant value is 0 or not. If not 0, the flow is returned to S127, while if 0, it comes into S134.

S127   It is checked whether there exists data input or not. If there exists the received data, the flow is forwarded to S124. Otherwise, it is forwarded to S126.

S128   Since the data has been received correctly, H is set at the output port P12 to permit output of the FSK signal. The respective bit data comprising the mark signal, start bit and the acknowledgment ACK0 are output sequentially in synchronous relation with the clocks.

S129   L is set at the output port P12 to inhibit output of the FSK signal.

S130   It is checked whether the FSK signal has been received on the receiving side.

S131   It is checked whether the received data is or not the acknowledgment ACK1 from the sending side to be dispatched in response to the acknowledgment ACK0 from the receiving side. If it is ACK1, the flow is forwarded to S133. Otherwise, it is forwarded to S132.

S132   The content of the limit counter is decremented, and then it is checked whether the resultant value is 0 or not. If not 0, the flow is returned to S128, while if 0, it comes into S134.

S133   Since the data transmission has been completed within the predetermined number of times set in the limit counter, "OK" is set to the transmission result code.

S134   Although the data transmission has been performed in the predetermined number of times set in the limit counter, both data and acknowledgment ACK1 are not transmitted correctly. Thus, "NG" is set to the transmission result code.

Figure 11A:
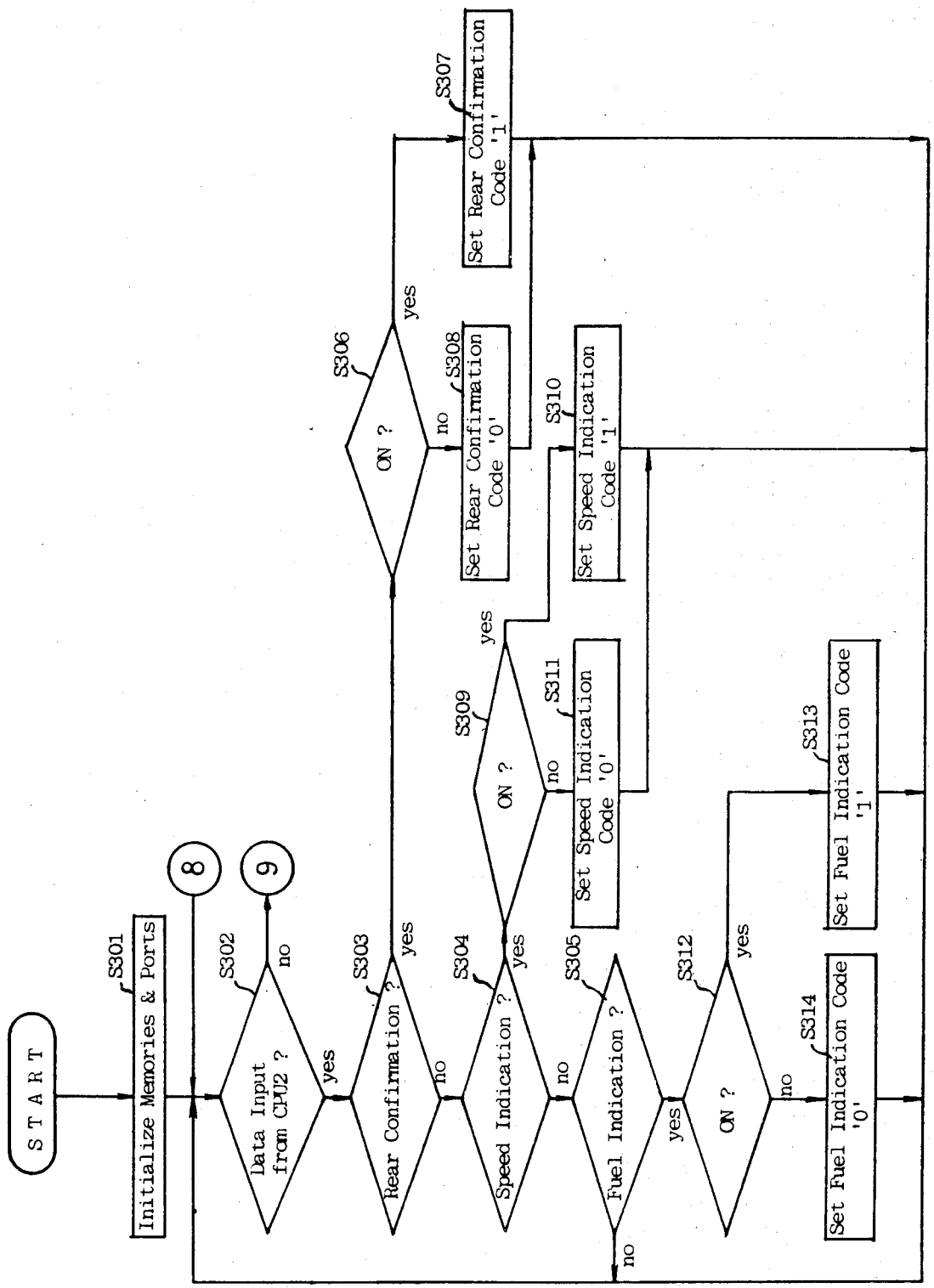

FIGS. 11a and 11b schematically show the operation of the microcomputer CPU3. Description will be now made with reference to FIGS. 11a and 11b.

S301   Levels at the output ports and the content of the memories are initialized (or cleared).

S302   Levels at the ports P22, P23 and P24 are monitored so as to check whether or not the data is sent from the CPU2.

S303   The data sent from the CPU2 is checked to judge whether or not the data instructs the rear confirmation indication. If YES, the program proceeds to S306. Thereafter, the rear confirmation indication code is set to "1" in S307 with the indication being set on, while the code is set to "0" in S308 with the indication being set off.

S304   The data sent from the CPU2 is checked whether or not the data instructs the vehicle speed indication. If YES, the program proceeds to S309. Thereafter, the vehicle speed indication code is set to "1" in S310 with the indication being set on, while the code is set to "1" in S311 with the indication being set off.

S305   The data sent from the CPU2 is checked to judge whether or not the data instructs the fuel indication. If YES, the program proceeds to S312. Thereafter, the fuel indication code is set to "1" in S313 with the indication being set on, while the code is set to "0" in S314 with the indication being set off.

S315   The rear confirmation cation code is checked. IF this code is "1", the program proceeds to S316 where both relays RL8 and RL9 are set on. In other words, the TV camera TVC is powered-on and the input terminal of the modulator 220 is connected to the output terminal of TVC. This permits an image on the rear of the vehicle taken by the TV camera TVC to be output in the form of a TV picture signal, so that the high frequency signal modulated by this signal is allowed to reach the steering control board through the transmission path 250. The high frequency signal thus transmitted is demodulated to the original TV picture signal by the tuner TU2 in the control board and then applied to the monitor TV set TV2. If the rear confirmation indication code is "0" in S315, the program moves into S317 where both relays RL8 and RL9 are set off. With this, the TVC is powered-off and the output terminal of the video RAM VRAM2 is connected to the input terminal of the modulator 220.

S318   The vehicle speed indication code is checked. If this code is "1", the vehicle speed indication is performed. In particular, the program first moves into S319 where a level at the input port P27 is monitored in a certain period of time so as to count the number of pulse signals applied thereto in such a period of time. Subsequently, the vehicle speed is calculated from the counted value in S320 and then the predetermined data for vehicle speed indication is written into the VRAM2's memory in S321. The VRAM2 produces a TV picture signal in accordance with the content of the memory, so that a signal including the information (numerical value) on vehicle speed indication is applied to the modulator 220 for conversion into a high frequency modulated signal and this signal is received by the tuner TU2 on the steering control board via the transmission path 250 and then demodulated therein, whereby the vehicle speed is displayed on the monitor TV set TV2. If the vehicle speed indication code is "0" as a result of the processing in this step S318, the program proceeds to S322 where the content of the VRAM2's memory is cleared. With this, display on the TV2 is cleared.

S323   The fuel indication code is checked. If this code is "1", the fuel indication is performed. In particular, the program first moves into S324 where the analog/digital converter ADC is instructed to make conversion (i.e., a signal is output to P14) and, after completion of this conversion (confirmed by checking P15), the converted data is read out from the ports P10 to P13. The converted data in turn is converted into the numeral data and, in accordance with the result thereof, the data is written into the predetermined memory of the video RAM VRAM1 in S325. Similarly to the VRAM2, the VRAM1 reads out the memory content sequentially to produce a TV picture signal corresponding to the content thus read out, which signal is then applied to the modulator 210. The high frequency modulated signal output from the modulator 210 is issued to the transmission path 250 through the mixer 230, this signal being received and demodulated in the tuner TU1 on the steering control board and then applied to the monitor TV set TV1. If the fuel indication code is "0" as a result of checking in S323, the content of the VRAM1's memory is cleared to disable the display on the TV1.

Figure 12:
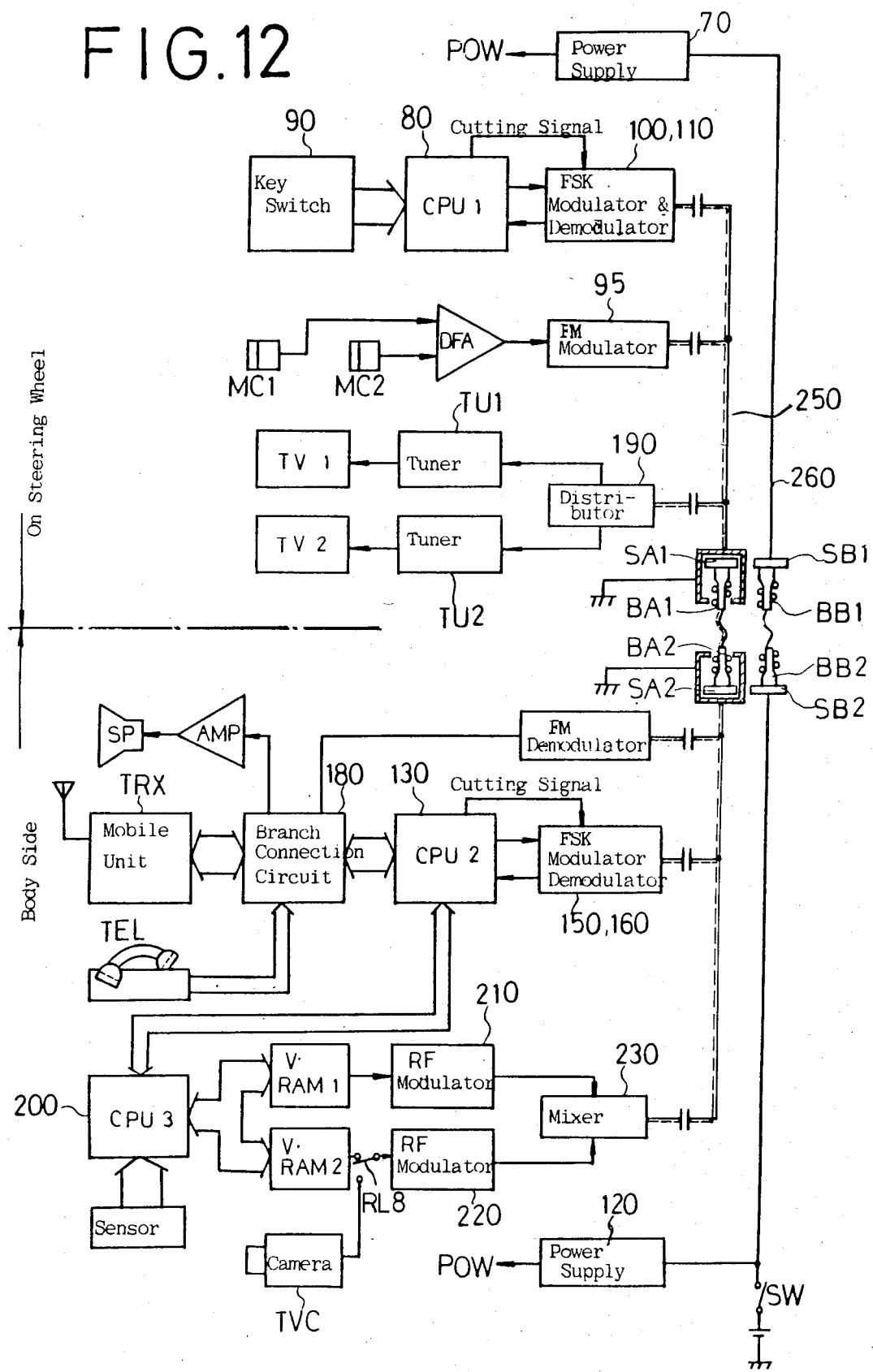
FIG. 12 is a block diagram showing another embodiment of the display device according to this invention.
Figure 13:
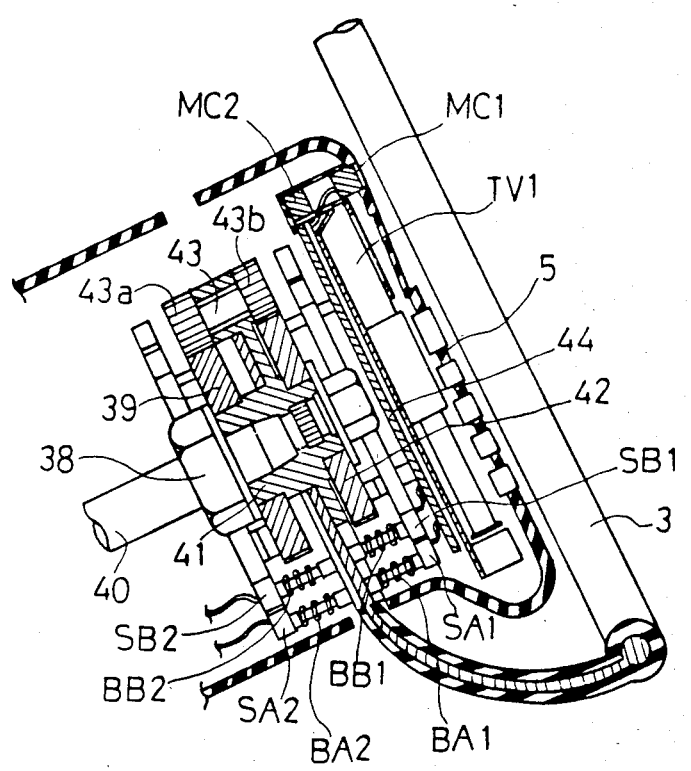
FIG. 13 is a side view showing the mounting structure for a steering wheel section of the vehicle equipped with the device of FIG. 12.

FIGS. 12 and 13 show another modified embodiment of this invention. Now referring to FIGS. 12 and 13, this modified embodiment includes a transmission path 260 used exclusively for feeding electric power. In a similar way to the transmission path 250, the transmission path 260 serves to connect the steering control board with the vehicle body electrically through an interconnection mechanism which comprises slip rings SB1, SB2 and brushes BB1, BB2. Since the signal line and the power line are independent from each other in this embodiment, the electric coils L1, L2, as shown in FIG. 1, for eliminating interference therebetween are dispensed with. The slip rings SB1 and SB2 are concentrically disposed at the inner side of the slip rings SA1 and SA2, respectively.

Although the Braun tube type display has been used as an indicator in the above mentioned embodiments, any other type indicator such as a liquid crystal display, a plasma display or an EL display, which is a relatively thin type, may be loaded on the steering control board.

According to this invention, as fully described in the above, various information can be indicated by the use of a two-dimensional display. Further, since the two-dimensional display is disposed on the steering control board, it becomes easier to see the indication even with a display small in its size. In addition, various signals are modulated to have different frequencies from each other and then output to a transmission path in a superimposed fashion, thereby facilitating the connection between the steering control board and the vehicle body.

Having now fully set forth both structure and operation of preferred embodiment of the concept underlying the present invention, various other embodiments as well as certain variations and modifications of the embodiment herein shown and described will obviously occur to those skilled in the art upon becoming familiar with the underlying concept. It is to be understood, therefore, that with the scope of the appended claims, the invention may be practiced otherwise than as specifically set forth herein.

What we claimed is:

1. A vehicle-loaded display device mounted on a vehicle having a steering wheel, said device comprising:
    transmission line means, including an electric conductor;
    a control board disposed at a central portion of said steering wheel;
    a supporting mechanism for supporting said control board in a stationary condition irrespective of turning of said steering wheel;
    at least one two-dimensional display means incorporated in said control board;
    electric filter means, incorporated in said control board, for transmitting a first electric signal having a frequency, within a desired frequency range, through said transmitting means;
    a first demodulation means incorporated in said control board for demodulating the first electric signal, received from said electric filter means, into display information and then applying the display information to said two-dimensional display means;
    a plurality of command switches incorporated in said control board;
    a first modulation means incorporated in said control board for FSK modulating a predetermined input code signal and for outputting a second electric signal through said transmission line means;
    a first electronic control device incorporated in said control board to be connected with said command switches and said first modulation means for generating said code signal in accordance with operation of said command switches and then applying the code signal to said first modulation means;
    a second modulation means disposed on a vehicle body in a position mechanically separated from said steering wheel for modulating an information signal into the first electric signal having a frequency different from and an amplitude much less than that of said second electric signal output by said first modulation means and then applying the first electric signal to said first demodulation means;
    a display information generating means for generating said display information and then applying the display information to said second modulation means;
    a second demodulation means, including a Schmitt trigger, disposed on the vehicle body in a position mechanically separated from said steering wheel, for demodulating said second electric signal into said code signal;
    a second electronic control device disposed on the vehicle body in a position mechanically separated from said steering wheel and electrically connected to said second demodulation means for instructing said display information generating means to generate the display information in accordance with said code signal; and
    an electric interconnection means, disposed beneath said steering wheel, said electric interconnection means comprising direct current blocking means for electrically connecting said first demodulation means and said first modulation means to said second modulation means and said second demodulation means, respectively, alternating current blocking means for electrically connecting a power supply line of said control board to a vehicle-loaded power supply, and said transmission line means,
    whereby said first and second electric signals having different amplitudes and frequencies, and said code signal which is FSK modulated, all may be transmitted over said transmission line means.

2. A vehicle-loaded display device according to claim 1, wherein said electric interconnection means further comprises first and second brushes mounted on said steering wheel in an opposed relation, a first slip ring rigidly connected to said control board and disposed so as to come into contact with said first brush, and a second slip ring rigidly connected to a stationary member of the vehicle body, which is mechanically separated from said steering wheel, and disposed so as to come into contact with said second brush.

3. A vehicle-loaded display device according to claim 2, wherein said first and second slip rings are each covered with an annular grounded conductor in at least a part thereof.

4. A vehicle-loaded display device according to claim 1, wherein said display information generating means comprises a plurality of display information sources and a change-over switch adapted to connect one of said sources with an output terminal of said display in information generating means, and said second electronic control device controls said change-over switch in accordance with the information output by said second demodulation means.

5. A vehicle-loaded display device according to claim 1, wherein said supporting mechanism comprises a first gear rigidly connected to the vehicle body in a fixed position mechanically separated from said steering wheel, a first shaft coupled to said steering wheel for corotation therewith, a second gear rigidly connected to said control board, a third gear rigidly connected to said first shaft and engaged with said first gear, and a fourth gear rigidly connected to said first shaft and engaged with said second gear.

6. A vehicle-loaded display device comprising:
a control board disposed at the central portion of a steering wheel through a supporting mechanism in a stationary condition irrespective of turning of said steering wheel;
at least one two-dimensional display means incorporated in said control board;
a first demodulation means incorporated in said control board for demodulating a first electric signal into display information and then applying the display information to said two-dimensional display means;
a plurality of command switches incorporated in said control board;
a first modulation means incorporated in said control board for modulating a predetermined input data signal;
a first electronic control device incorporated in said control board to be connected with said command switches and said first modulation means for generating a code signal in accordance with operation of said command switches and then applying the code signal to said first modulating means;
a second modulation means disposed on a vehicle body in a position mechanically separated from said steering wheel for modulating an information signal into the first electric signal having its frequency different from that of a second electric signal output by said first modulation means and then applying the first electric signal to said first demodulation means;
a display information generating means for generating said display information and then applying the same to said second modulation means, said display information generating means comprising a plurality of display information sources and a change-over switch adapted to connect one of those sources with an output terminal of said means, and said second electronic control device controls said change-over switch in accordance with the information output by said second demodulation means;
a second demodulation means disposed on the vehicle body in a position mechanically separated from said steering wheel for demodulating said second electric signal into said code signal;
a second electronic control device disposed on the vehicle body in a position mechanically separated from said steering wheel and connected to said second demodulation means electrically for instructing said display information generating means to generate the display information in accordance with said code signal demodulated by said second demodulation means;
a first electric interconnection means disposed beneath said steering wheel for electrically connecting said first demodulation means and said first modulation means to said second modulation means and said second demodulation means, respectively, and
a second electric interconnection means disposed beneath said steering wheel for electrically connecting a power supply line of said control board to a vehicle-loaded power supply.

* * * * *